(12) United States Patent
Iyoki et al.

(10) Patent No.: US 7,288,762 B2
(45) Date of Patent: Oct. 30, 2007

(54) FINE-ADJUSTMENT MECHANISM FOR SCANNING PROBE MICROSCOPY

(75) Inventors: Masato Iyoki, Chiba (JP); Akihiko Hidaka, Chiba (JP); Kazutoshi Watanabe, Chiba (JP)

(73) Assignee: SII NanoTechnology Inc. (JP)

( * ) Notice: Subject to any disclaimer, the term of this patent is extended or adjusted under 35 U.S.C. 154(b) by 455 days.

(21) Appl. No.: 11/045,916

(22) Filed: Jan. 28, 2005

(65) Prior Publication Data
US 2005/0231066 A1    Oct. 20, 2005

(30) Foreign Application Priority Data
Feb. 13, 2004    (JP)    ............... 2004-037079

(51) Int. Cl.
*H01L 41/04* (2006.01)
(52) U.S. Cl. ............... 250/306; 307/310; 307/311; 307/442.1; 310/311; 310/328; 310/331; 73/105; 977/872
(58) Field of Classification Search ............... None
See application file for complete search history.

(56) References Cited

U.S. PATENT DOCUMENTS 5,173,605 A * 12/1992 Hayes et al. ............... 250/306
5,705,741 A * 1/1998 Eaton et al. ............... 73/105
5,948,972 A * 9/1999 Samsavar et al. ............. 73/105

* cited by examiner

*Primary Examiner*—Jack I. Berman
*Assistant Examiner*—Zia R. Hashmi
(74) *Attorney, Agent, or Firm*—Adams & Wilks

(57) ABSTRACT

The invention provides a fine-adjustment mechanism for a scanning probe microscopy with high rigidity and high degree of measurement accuracy wherein a strain gauge displacement sensor which can be installed in a small space is arranged so that temperature compensation is achieved. The fine-adjustment mechanism composed of a piezoelectric device is provided with at least two-piece electrode. One of the electrodes is configured as a dummy electrode, to which no voltage is applied, and the other electrode is configured as an active electrode which generates strain when voltage is applied. One or two resistors are provided on each of the active electrode and dummy electrode, and a bridge circuit is configured by the resistors.

5 Claims, 21 Drawing Sheets

FINE-ADJUSTMENT MECHANISM FOR SCANNING PROBE MICROSCOPY

BACKGROUND OF THE INVENTION

1. Field of the Invention

The present invention relates to a fine-adjustment mechanism for a scanning probe microscopy for scanning a sample by adjusting relative positions of a probe and the sample with a fine-adjustment mechanism for performing measurement of roughness or physical properties of a sample surface, machining of the sample surface, or movement of a substance on the sample surface by the use of a probe.

2. Description of the Related Art

In a fine-adjustment mechanism of a scanning probe microscopy in the related art, for example, a cylindrical piezoelectric device as shown in FIG. 8 and FIG. 9 is employed (for example, see Patent Publication No. 2598665, pp. 4, FIG. 1). FIG. 8A is a cross-sectional view of a cylindrical piezoelectric device, and FIG. 9 is an expansion plan of an outer peripheral surface. In this related art, a common electrode 82 is provided inside a piezoelectric device 81 formed into hollow cylindrical shape, and an outer electrode is formed into a two-level structure, including a band-shaped electrode 83 extending along the circumference thereof on a first level and an electrode 84 which divides the circumference into four parts on the second level.

The band-shaped electrode 83 of the cylindrical piezoelectric device 81 is applied with a poling treatment uniformly from the inner electrode 82 to the outer electrode 83, and the quadrant electrode 84 is applied with the poling treatment so that two sets of electrodes 84a, 84c and 84b, 84d located on the opposite sides with respect to a center axis have opposite polarities from the inner electrode 82. Arrows indicated in FIG. 8A show poling direction at each electrode, and plus and minus signs in FIG. 9 represent polarities of poling in the direction of outer peripheral surface.

When a potential difference is provided between the inner electrode 82 and the band-shaped electrode 83 on the first level from a power source 83, a strain in the direction of thickness is generated in the area where the band-shaped electrode 83 is provided along the entire circumference, and consequently, the cylindrical piezoelectric device 81 is displaced toward the direction of the center axis (hereinafter referred to as Z-direction).

When voltage is applied between the two opposing electrodes 84a, 84c and 84b, 84d of the quadrant electrode 84 provided on the second level from the power supplies 86, 87, one of the electrodes is expanded in the axial direction and the other electrode is contracted in the axial direction as shown in FIG. 8B, whereby the cylindrical piezoelectric device is bent with respect to the axial direction. When the distal end 81a of the cylindrical piezoelectric device is fixed as a fixed end and the proximal end 81b of the same is remained free as a free end, the distal portion 81b is displaced into an arcuate shape in the direction indicated by an arcuate arrow in FIG. 8B. When the angle of strain is minute, the distal end moves approximately within a plane orthogonal to the center axis. Therefore, displacement within a two-dimensional plane (hereinafter referred to as X-Y direction) is achieved by the quadrant electrode 84. Normally, the quadrant electrode 84 is provided on the fixed end side, and is configured in such a manner that the output displacement is increased by an amount corresponding to the length of the band-shaped electrode 83.

In the scanning probe microscopy, measurement of roughness or physical properties on the sample surface, machining of the sample surface, or movement of a substance on the sample surface by the probe are enabled by providing the sample or the probe at the distal end of the cylindrical piezoelectric device and causing the sample or the probe to scan in the X-Y direction while controlling the distance in the Z-direction.

By configuring the fine-adjustment mechanism for the scanning probe microscopy with the cylindrical piezoelectric device configured as described above, the following advantages are achieved.

(1) With the piezoelectric device, fine-adjustment with high degree of accuracy on the order of sub-nanometer is achieved.

(2) By forming the piezoelectric device into cylindrical shape, rigidity of the device unit is increased, and by combining fine-adjustment mechanisms in X, Y, and Z directions into a unit, the entire device can be downsized, and rigidity of the device can be enhanced. Consequently, anti-vibration property or scanning speed can be improved.

However, when moving the probe and the sample with respect to each other by the piezoelectric device, non-linear movement is resulted due to hysteresis or creeping characteristic of the piezoelectric device, thereby generating displacement error.

Therefore, a method of compensating by calculation after having obtained a hysteresis curve of the piezoelectric device or a method of measuring displacement of the piezoelectric device directly by a displacement sensor are employed.

Therefore, when compensating the error by calculation, since there arise various parameters such as variations in machining among devices, the peripheral temperature, the range of scanning, the speed of scanning, and the direction of scanning as factors which determine the action of the piezoelectric device, it is difficult to establish a compensation formula considering all these parameters, whereby sufficient accuracy of measurement cannot be achieved.

When integrating a displacement sensor on the other hand, a capacitance type displacement sensor, an optical displacement sensor, a linear variable differential transformer displacement sensor, or an eddy-current displacement sensor is used. However, these sensors are all bulky and hence a large space is required for installation, thereby increasing the size of the entire device. Consequently, rigidity of the device is decreased, whereby resolution or scanning speed is deteriorated. The cost of the displacement sensor itself is also high.

A method using a strain gauge is know as a method which can be implemented in a small space and enables easy detection of displacement (for example, see "Revised New Edition: Approach to Measurement of Strain Using a Strain Gauge", attributed to Sho Takahashi, Masayasu Kawai, published from Taiseisha, Jun. 1, 2001, pp. 63, pp. 95-pp. 97))

In general, a metallic resistor is used in the strain gauge. A problem found in a case where the strain gauge is used is that a high resolution cannot be obtained due to deterioration of S/N ratio when measuring fine strain, and that the value of resistance varies with temperature significantly, whereby the magnitude of error of measurement increases.

Therefore, in general, a bridge circuit is configured with four resistors for compensating temperature and amplifying the output.

FIG. 10 is a drawing showing a bridge circuit used for strain measurement. The amount of strain of the resistors R1 to R4 are represented by $\epsilon_1$ to $\epsilon_4$, and the output voltage e when a voltage E is applied to the circuit is represented by an expression below.

$$e = Ks/4 \cdot (\epsilon_1 - \epsilon_2 + \epsilon_3 - \epsilon_4) \cdot E \quad (1)$$

where $K_s$ is referred to as gauge factor, which is specific for the type of the strain gauge. When configuring a bridge circuit, it is necessary to select the strain gauges of the same gauge factor.

When detecting strain in the direction of compression/extension, a bridge circuit is configured with the strain gauges mounted as shown in FIG. 11 to FIG. 15. In the following description, strain generated in the device is represented as $\epsilon$, and temperature strain generated on the gauge due to variation in temperature is represented as $\epsilon_T$. Wiring to the strain gauges is not shown.

FIG. 11 refers to a Single-Gauge Method. FIG. 11A shows a method of adhering the strain gauge, and FIG. 11B shows a wiring method of the strain gauge. As shown in FIG. 11A, a strain gauge 112 is adhered on a member 111 which is expanded and contracted in the direction of the center axis as indicated by an arrow and generates compression/extension strain. The strain gauge 112 is formed with a resistor 113 in the direction of the center axis, whereby a bridge circuit as shown in FIG. 11B is configured. The resistors other than R1 are fixed resistors. The amount of strain of the fixed resistors is zero, the output voltage is:

$$e = Ks/4 \cdot (\epsilon + \epsilon_T) \cdot E \quad (2)$$

from the expression (1). Therefore, in the case of Single-Gauge Method, the temperature compensation by the bridge circuit cannot be performed.

FIG. 12 refers to a Two-Gauge Method. FIG. 12A shows a method of adhering the strain gauges, FIG. 12B shows a wiring method of the strain gauges. As shown in FIG. 12A, the strain gauges 122, 123 are adhered to a member 121 which is expanded and contracted in the direction of the axis as shown in the arrow and generates compression/extension strain in such a manner that the resistors 124, 125 are oriented in the direction of the center axis and the direction orthogonal to the direction of the center axis, whereby a bridge circuit as shown in FIG. 12B is configured. Reference numerals R3, R4 represent fixed resistors having the same value of resistance as the strain gauges. In this case, when Poisson's ratio of material is represented by v, and strain in the direction of center axis is represented by $\epsilon$, the expression $$e = Ks/4 \cdot (1+v) \epsilon \cdot E \quad (3)$$

is satisfied. In other words, the temperature compensation is achieved, and the output voltage is amplified to 1+v times.

FIG. 13 also shows Two-Gauge Method. FIG. 13A shows a method of adhering the strain gauges and FIG. 13B shows a wiring method of strain gauge. In this case, as shown in FIG. 13(a), the strain gages 132, 133 are adhered on a member 131 which is expanded and contracted in the direction of the center axis as indicated by an arrow and generates compression/extension strain in such a manner that the resistors 134, 135 extends in parallel with the direction of the center axis, whereby a bridge circuit as shown in FIG. 13B is configured. The resistors R2, R4 are fixed resistors having the same value of resistance as the strain gauge. The output voltage in this case is:

$$e = Ks/4 \cdot 2(\epsilon + \epsilon_T) \cdot E \quad (4)$$

In other words, the output voltage is doubled, and the amount of strain due to the temperature is also doubled. Therefore, temperature compensation is not achieved.

FIG. 14 shows a method referred to as Four-Gauge Method. FIG. 14A shows a method of adhering strain gauges, and FIG. 14B shows a method of wiring the strain gauges. As shown in FIG. 14A, the strain gauges 142-144 are adhered on the member 141 which is expanded and contracted in the direction of the center axis as indicated by an arrow and generates compression/extension strain in such a manner that the resistors 146, 148 of the strain gauges 142, 144 are oriented in the direction of the center axis, and the resistors 147, 149 of the strain gauges 143, 145 are oriented in the direction orthogonal to the center axis, whereby a bridge circuit as shown in FIG. 14B is configured. The output voltage in this case is:

$$e = Ks/4 \cdot 2(1+v) \epsilon \cdot E \quad (5)$$

In other words, the temperature compensation is achieved, and the output voltage is amplified to 2(1+v) times.

FIG. 15 is a system referred to as Active-Dummy system of Two-Gauge Method. FIG. 15A is a method of adhering strain gauges, FIG. 15B is a wiring method of the strain gauges. As shown in FIG. 15A, the strain gauge 153 is adhered on the member 151 which is expanded and contracted in the direction of the center axis as indicated by an arrow in such a manner that the resistor 154 of the strain gauge 153 is oriented in parallel with the center axis, and the strain gauge 155 is adhered on another member 152 formed of the same member as the member 151 in such a manner that the resistor 156 is oriented in parallel with the center axis, whereby a bridge circuit as shown in FIG. 15B is configured. The resistors R3, R4 here are fixed resistors having the same value of resistance as the strain gauges. In this system, the strain gauge 153 of the device 151 which generates strain serves as an active gauge, and the strain gauge 155 which is adhered on the separate member 152 formed of the member of the same material as the device serves as a dummy gauge. When the active gauge and the dummy gauge are placed under the same environment, the amount of strains with respect to the temperature is nearly the same, and hence strain due to the temperature is cancelled, whereby the output voltage of the bridge circuit is:

$$e = Ks/4 \cdot \epsilon \cdot E \quad (6)$$

In the case of the fine-adjustment mechanism using the piezoelectric device, the amount of strain is extremely minute. Therefore, when accuracy on the order of sub-nanometer is required as in the case of the scanning probe microscopy, measurement error due to the influence of the temperature of the strain gauge cannot be ignored, and hence temperature compensation must be performed.

In this case, it is essential to perform the temperature compensation by one of the above-described methods shown in FIG. 12, 14, or 15.

In addition, in order to obtain the accuracy on the order of sub-nanometer, the metal gauge is insufficient in output signal and low in S/N ratio, whereby required output signal cannot be obtained. Therefore, a strain gauge having a resistor formed of semi-conductor material, which has higher gauge factor $K_s$ than the metal gauge is used.

The semiconductor gauge has a high gauge factor, but then comes under significant strain due to the temperature. Therefore, the temperature compensation by the bridge circuit is essential.

However, the semiconductor gauge is smaller in maximum allowable strain than the metal gauge. Therefore, when the semiconductor strain gauge is adhered on a curved surface, it is bent to a degree exceeding the maximum allowable strain, and hence measurement cannot be performed. Therefore, adhesion in the circumferential direction of the cylindrical piezoelectric device as shown in FIG. 12 or FIG. 14 is not possible, whereby the temperature compensation cannot be achieved.

In the active-dummy system shown in FIG. 15, it is necessary to place various subjects to be detected under the identical environment. In the case of the scanning probe microscopy, since the member to which the dummy gauge is adhered is placed under the identical environment to the fine-adjustment element, it is necessary to place the member at a position as close as possible to the fine-adjustment mechanism. However, when this space for installing the member for the dummy gauge is secured in the unit of the scanning probe microscopy, the entire device is upsized, rigidity is deteriorated, and measurement accuracy is degraded. When the member for the dummy gauge is disposed outside the unit, there arises a difference in environment of installation. In the scanning probe microscopy, even a small difference in environment affects significantly on the measurement accuracy. Furthermore, since the piezoelectric devices as material of the fine-adjustment mechanism vary in mechanical characteristics due to the machining method, it is necessary to even out the characteristics of member forming the portion on which the active gauge is adhered and the portion on which the dummy gauge is adhered as much as possible.

In order to solve the problems described above, the present invention provides a fine-adjustment mechanism for a scanning probe microscopy for fine-adjusting the relative position between a subject to be measured (sample) and a probe in order to measure roughness or physical properties of the subject to be measured by scanning the surface of the subject to be measured by the probe including: a piezoelectric device constituting the fine-adjustment mechanism; at least two electrodes for applying voltage to the piezoelectric device, at least one of the electrodes being used as a dummy electrode on which no voltage is applied and the other electrode being used as an active electrode that generates a strain on the piezoelectric device when applied with voltage; one or two resistors for detecting the strain at one or two positions on the active electrode; and one or more resistors provided on the dummy electrode, wherein the respective resistors on the active electrode and the dummy electrode are connected so that temperature compensation is performed by the resistor on the dummy electrode when strain detection is performed by the resistor on the active electrode to form a bridge circuit.

Also, two or more active electrodes are provided and the respective resistors of the active electrodes share the identical resistor for temperature compensation on the dummy electrode to configure a bridge circuit.

Furthermore, the fine-adjustment mechanism is formed of a hollow cylindrical piezoelectric device comprising a common electrode provided within the cylinder and two or more electrodes on the outside thereof, wherein at least one of the two or more electrodes on the outside is used as a dummy electrode.

Still further, the resistor is formed of a linear pattern of semiconductor and is arranged so that the longitudinal directions of the linear pattern of resistor provided on each of the active electrode and the dummy electrode extend in parallel with the direction of the center axis of the cylindrical piezoelectric device.

SUMMARY OF THE INVENTION

Accordingly, it is a subject of the present invention to provide a fine-adjustment mechanism for a scanning probe microscopy with high rigidity and high degree of measurement accuracy by arranging a strain gauge displacement sensor which can be installed in a small space so as to be capable of temperature compensation.

In the fine-adjustment mechanism for a scanning probe microscopy configured as described above, the strain can be measured by the resistor. Therefore, the fine-adjustment mechanism operates as an actuator with favorable linearity without being affected by hysteresis or creeping of the piezoelectric device, and hence measurement accuracy is improved. Also, by employing the strain gauge for measuring displacement, the space required for installation is smaller than other displacement sensor, and hence the device is downsized and rigidity is improved.

In general, in the case of the strain gauge using the resistor, the strain is generated on the resistor itself due to the temperature, whereby the measurement accuracy is deteriorated. The present invention provides a fine-adjustment mechanism formed of the piezoelectric device including: at least two electrodes for applying voltage to the piezoelectric device, at least one of the electrodes being used as a dummy electrode on which no voltage is applied and the other electrode being used as an active electrode that generates a strain on the piezoelectric device when applied with voltage; one or two resistors for detecting the strain at one or two positions on the active electrode; one or more resistors provided on the dummy electrode, wherein the respective resistors on the active electrode and the dummy electrode are connected so that temperature compensation is performed by the resistor on the dummy electrode when strain detection is performed by the resistor on the active electrode to form a bridge circuit. Consequently, the influence of temperature drift is eliminated, and measurement accuracy is improved.

In this case, since the active electrode and the dummy electrode are provided on the identical piezoelectric device, the environment of installation and the state of installation of the respective resistors can be compared under almost the same conditions, whereby accuracy of temperature compensation is improved.

The fine-adjustment mechanism includes two or more active electrodes, and the respective resistors of the active electrodes share the identical resistor for temperature compensation on the dummy electrode to configure a bridge circuit.

Accordingly, a space for installing the resistors on the dummy electrode can be used efficiently, and the number of the resistors to be mounted on the dummy electrodes is reduced, thereby reducing wiring. Consequently, the entire device can be downsized, and rigidity of the unit is increased.

By configuring the fine-adjustment mechanism of a cylindrical piezoelectric device, the device is further downsized, and rigidity of the device is improved.

Furthermore, when two each of resistors are provided on the active electrode and the dummy electrode, and the output signal is taken out via the bridge circuit, the output signal is doubled in comparison with the case in which the output signal is taken from one each of electrode, whereby S/N ratio of the output signal is improved.

Since the semiconductor is used for the resistor, finer strain can be measured in comparison with the case where the resistor formed of metal is used, whereby accuracy of displacement measurement of the fine-adjustment mechanism for the scanning probe microscopy is further improved.

BRIEF DESCRIPTION OF THE DRAWINGS

FIG. 8 is a drawing showing the fine-adjustment mechanism for a scanning probe microscopy formed of a cylindrical piezoelectric device in the related art, wherein

FIG. 11 is a drawing showing Single-Gauge Method in the relate art for detecting compression/extension strain, in which

FIG. 12 is a drawing showing Two-Gauge Method (with temperature compensation) in the related art for detecting compression/extension strain, in which

FIG. 13 is a drawing showing Two-Gauge Method (without temperature compensation) for detecting compression/extension strain, in which

FIG. 14 is a drawing showing Four-Gauge Method (without temperature compensation) in the related art for detecting compression/extension strain, in which FIG. 15 is a drawing showing Active-Dummy method in the related art for detecting compression/extension strain, in which

DESCRIPTION OF THE PREFERRED EMBODIMENTS

Figure 1:
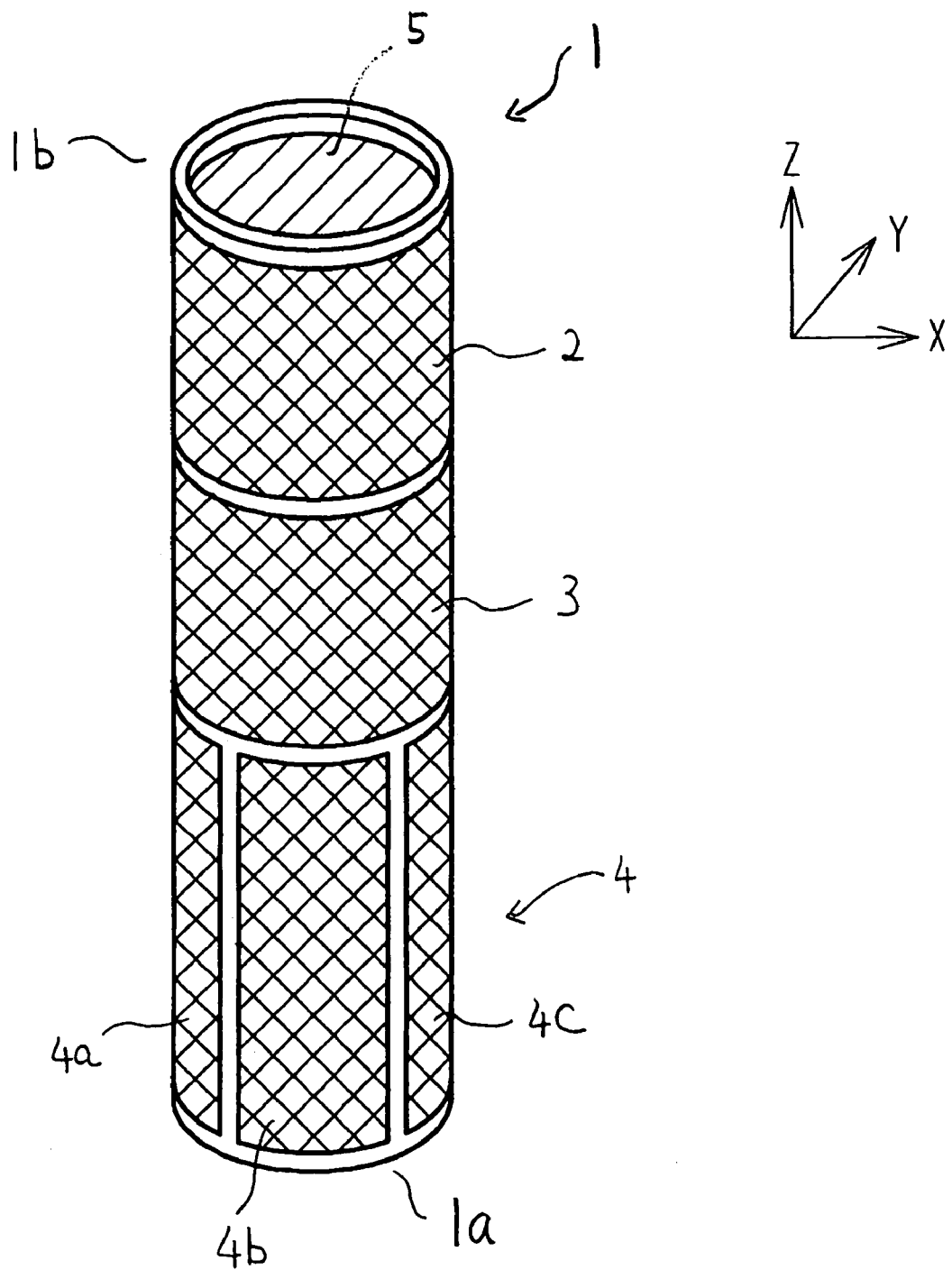
FIG. 1 is an outline view of a fine-adjustment mechanism for a scanning probe microscopy formed of a cylindrical piezoelectric device according to a first embodiment of the present invention.

Referring now to the drawings, preferred embodiments of the present invention will be described.

First Embodiment

A first embodiment of a fine-adjustment mechanism for a scanning probe microscopy of the invention is shown in FIG. 1 to FIG. 4. FIG. 1 is an outline view of a fine-adjustment mechanism formed of a cylindrical piezoelectric device according to the first embodiment of the invention.

In the first embodiment, a cylindrical piezoelectric device 1 is formed by forming the piezoelectric device into a hollow cylindrical shape as shown in FIG. 1. A common electrode 5 is provided within the cylindrical piezoelectric device 1. The entire outer periphery of the cylindrical piezoelectric device 1 is divided into three levels of a first level (upper level), a second level (middle level), and a third level (lower level) from the distal end 1b to the proximal end 1a. A Z-electrode 2 used as an active electrode for generating strain toward the center axis of the cylinder and a dummy electrode 3 used as a dummy electrode are provided on the two levels of the first level and the second level, respectively, into band shapes along the outer periphery of the cylinder. On the third level which is the lower level at the proximal end is provided with a quadrant electrode 4 which divides the circumference into four in the circumferential direction.

Figure 2:
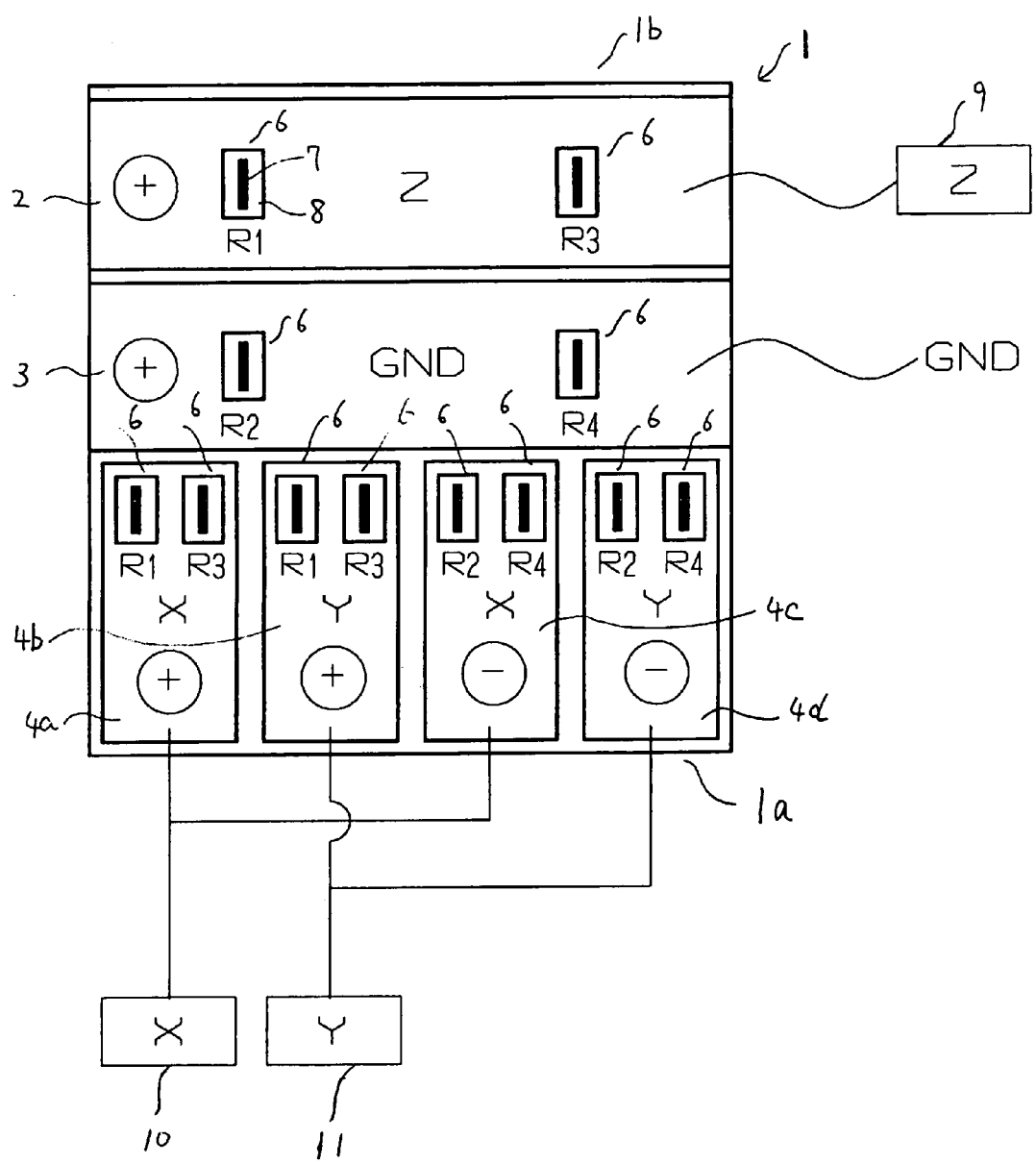
FIG. 2 is an expansion plan of the fine-adjustment mechanism shown in FIG. 1.

FIG. 2 is an expansion plan of the cylindrical piezoelectric device 1 shown in FIG. 1, showing a method of adhering strain gauges used as resistors for measuring strains of the respective electrodes, the polarity of poling, and wiring for voltage applied to the respective electrodes.

A band-shaped Z-electrode 2 and the dummy electrode 3 of the cylindrical piezoelectric device 1 is applied with poling processing uniformly from the inner electrode (common electrode 5) to the outer electrode (band-shaped Z-electrode 2, the dummy electrode 3) of the cylinder. The quadrant electrodes 4a, 4b, 4c, 4d are applied with poling from the inner electrode (common electrode 5) toward the quadrant electrodes 4a, 4b, 4c, 4d so that the polarity becomes opposite with respect to the common electrode 5. Such polarities provided by poling are represented by the reference signs of plus and minus for each electrodes in FIG. 2. The Z-electrode 2 has a plus polarity, the band-shaped dummy electrode 3 has plus polarity, X-electrode 4a and Y-electrode 4b of the quadrant electrodes 4a, 4b, 4c, 4d have plus polarities, and X-electrode 4c and Y-electrode 4d have minus polarities respectively.

Two each, that is, four in total of strain gauges 6 are adhered and fixed to the band-shaped Z-electrode 2 and the dummy electrode 3 on the first level and the second level. The strain gauge 6 is obtained by forming a semiconductor 7 formed of N-type silicone on a base material 8 formed of insulating paper and phenol-epoxy resin in a linear pattern. The strain gauges 6 are adhered and fixed on the band-shaped Z-electrode 2 and the dummy electrode 3 in such a manner that the longitudinal direction of the linear pattern of the semiconductor 7 extends in parallel with (that is, the same direction as) the center axis of the cylinder.

Two each, that is eight in total strain gauges 6 which are similar to the strain gauges 6 adhered and fixed to the band shaped electrodes 2, 3 are adhered and fixed to the quadrant electrodes 4a, 4b, 4c, 4d so that the longitudinal direction of the linear patterns extend in parallel with the center axis of the cylinder.

In the first embodiment, twelve strain gauges 6 in total, each having a semiconductor resistor are used for amplifying the output voltage and enabling measurement of fine strain.

The common electrode 5 of the fine-adjustment device is grounded, and as shown in FIG. 2, the band-shaped Z-electrode on the first level is connected to a power supply 9, and the band-shaped dummy electrode 3 on the second level is grounded as it is represented by "GND" (abbreviation of GROUND).

Power supplies 10, 11 are connected between the opposing two electrodes 4a, 4c and 4b, 4d of the quadrant electrode 4 provided on the third level, respectively.

When the same voltage is applied to the opposing two electrodes, strain of compression and extension occurs respectively in the poling direction. At this time, strain is generated also in the direction orthogonal to the poling direction. Consequently, one of the electrodes expands in the axial direction and the other electrode contracts in the axial direction, and as a result, the cylindrical piezoelectric device 1 is bent in the direction orthogonal to the center axis.

Figure 8A:
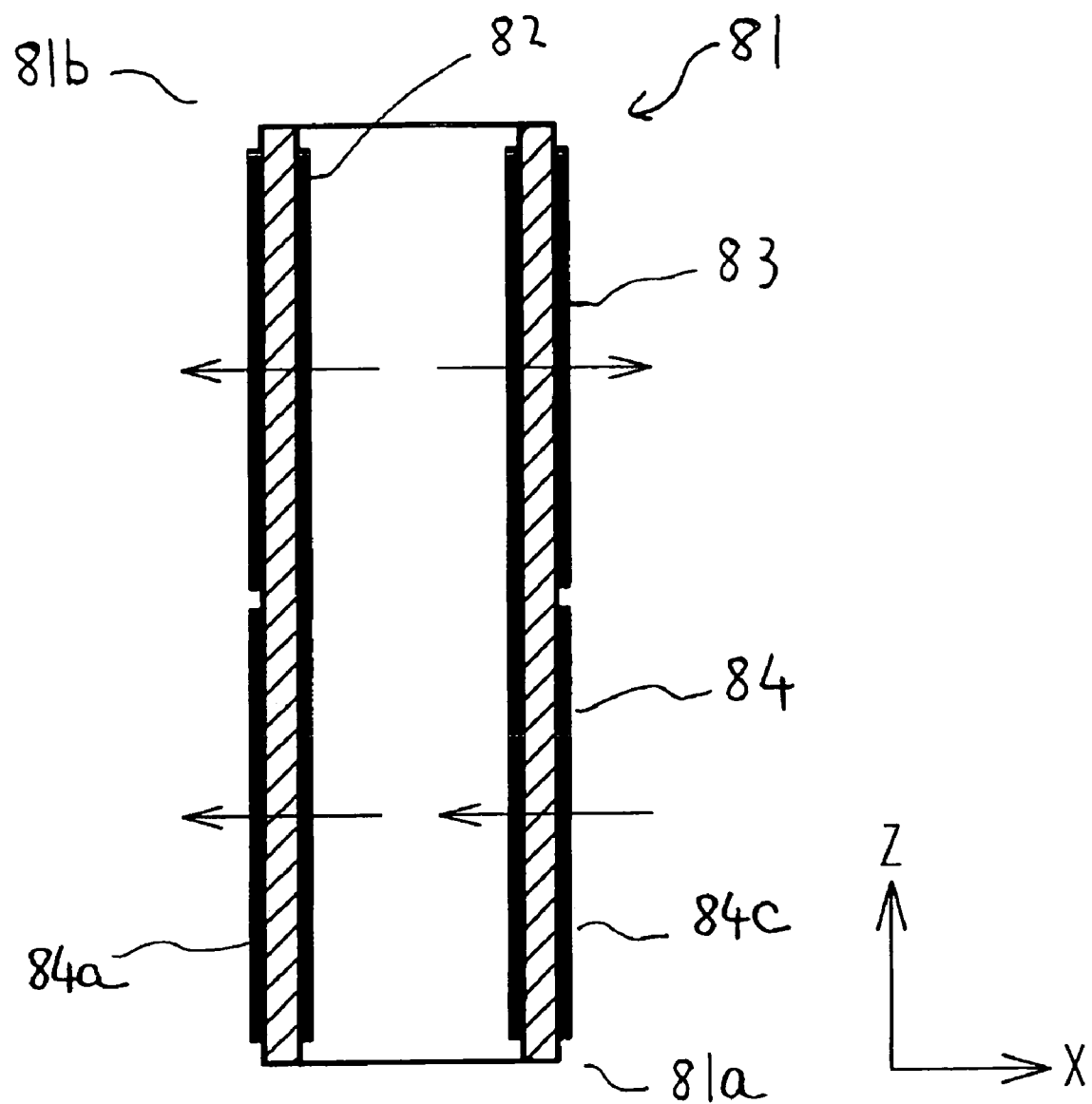
FIG. 8A is a cross-sectional view and FIG. 8B is a front view showing a driving state.
Figure 8B:
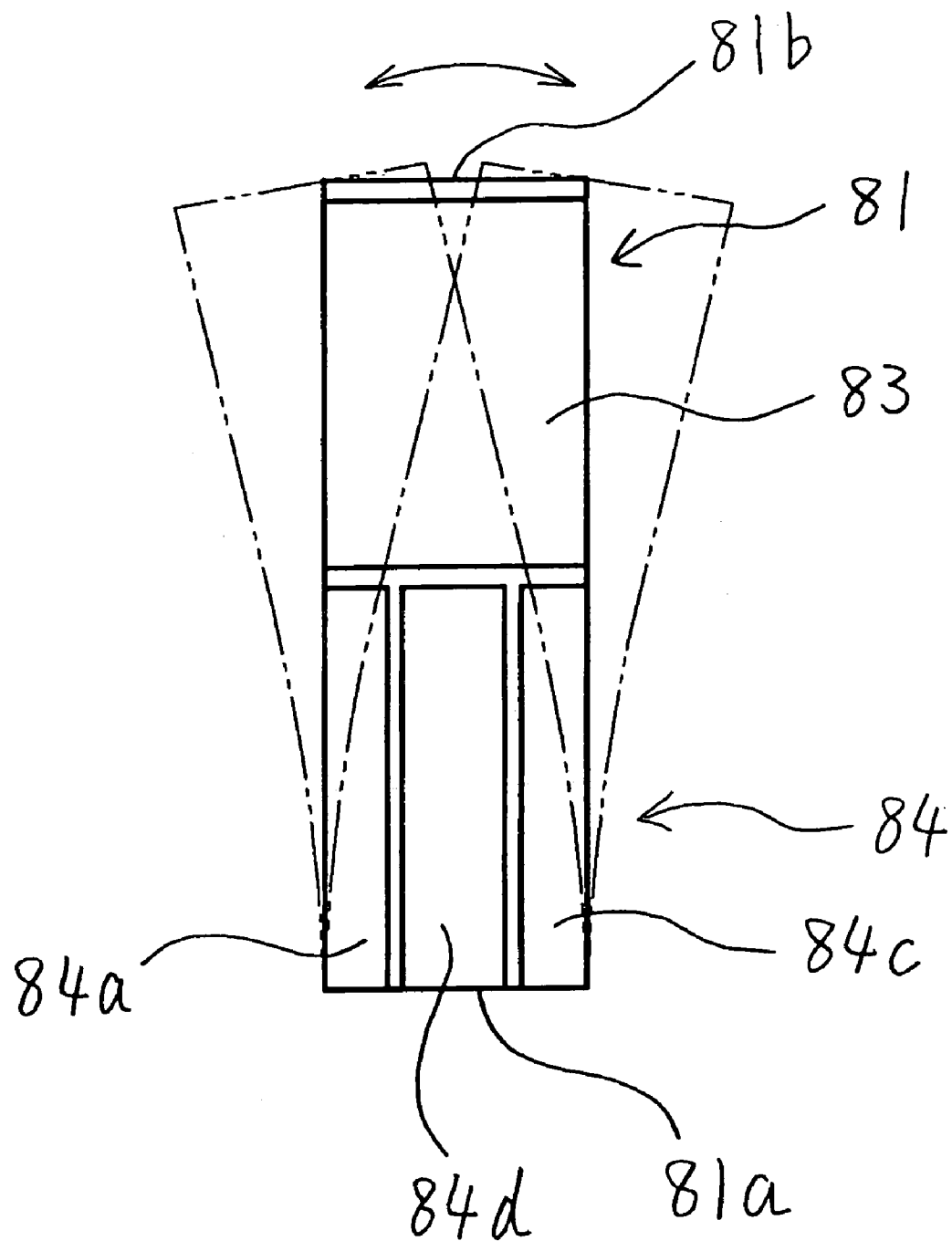
Figure 9:
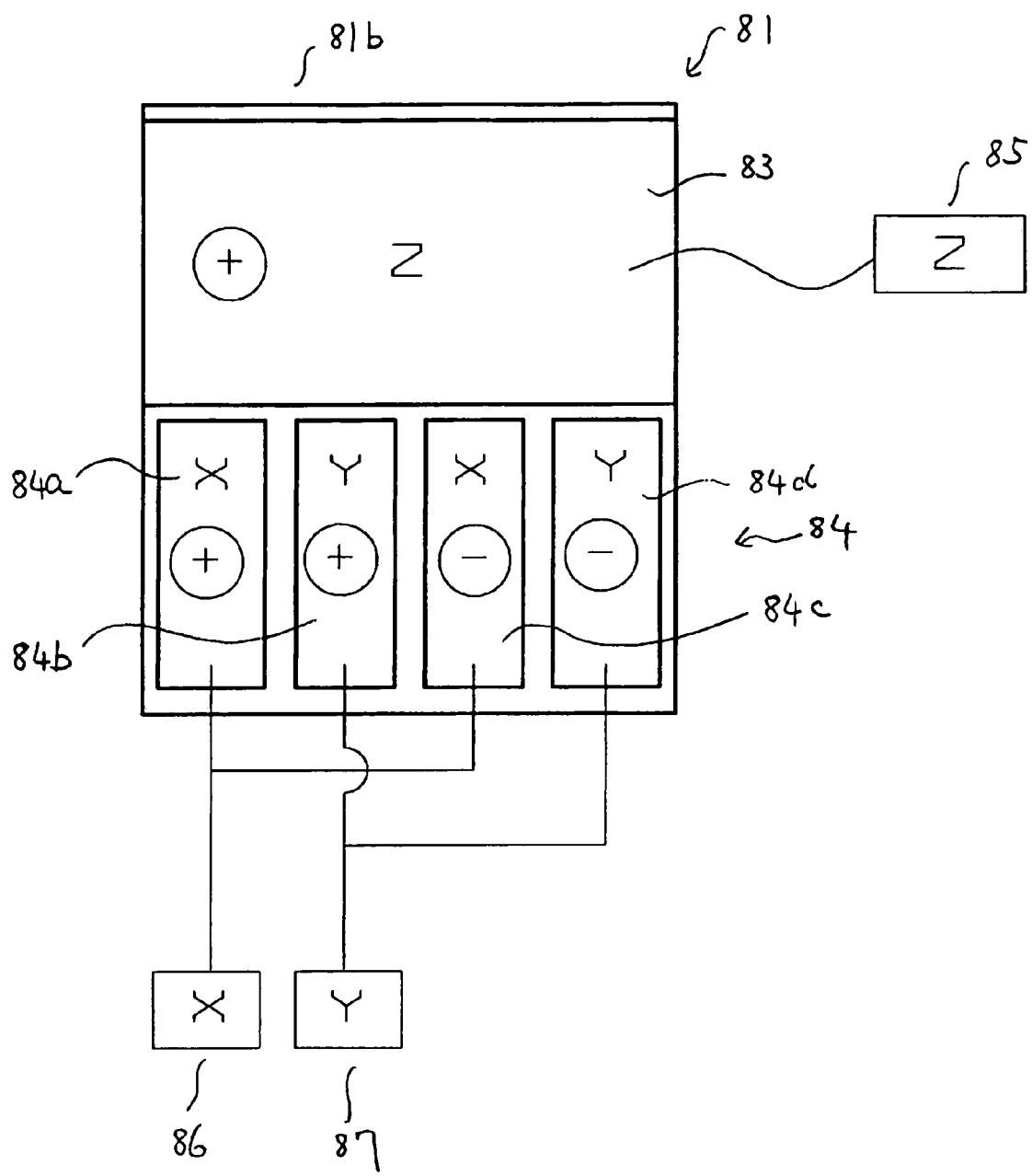
FIG. 9 is an expansion plan of the fine-adjustment mechanism in the related art shown in FIG. 8.
Figure 10:
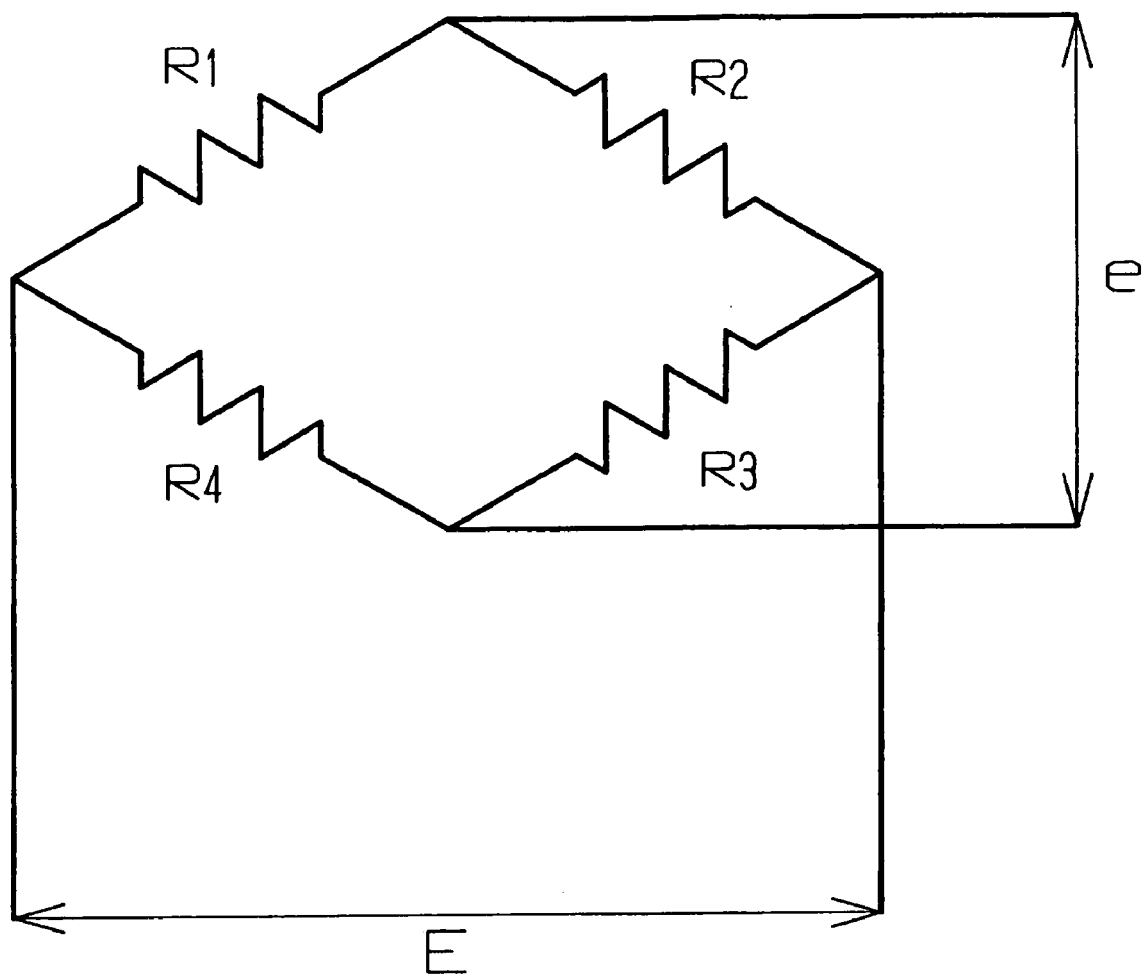
FIG. 10 is a connection circuit diagram of a bridge circuit for detecting an output signal of the strain gauge.
Figure 11A:
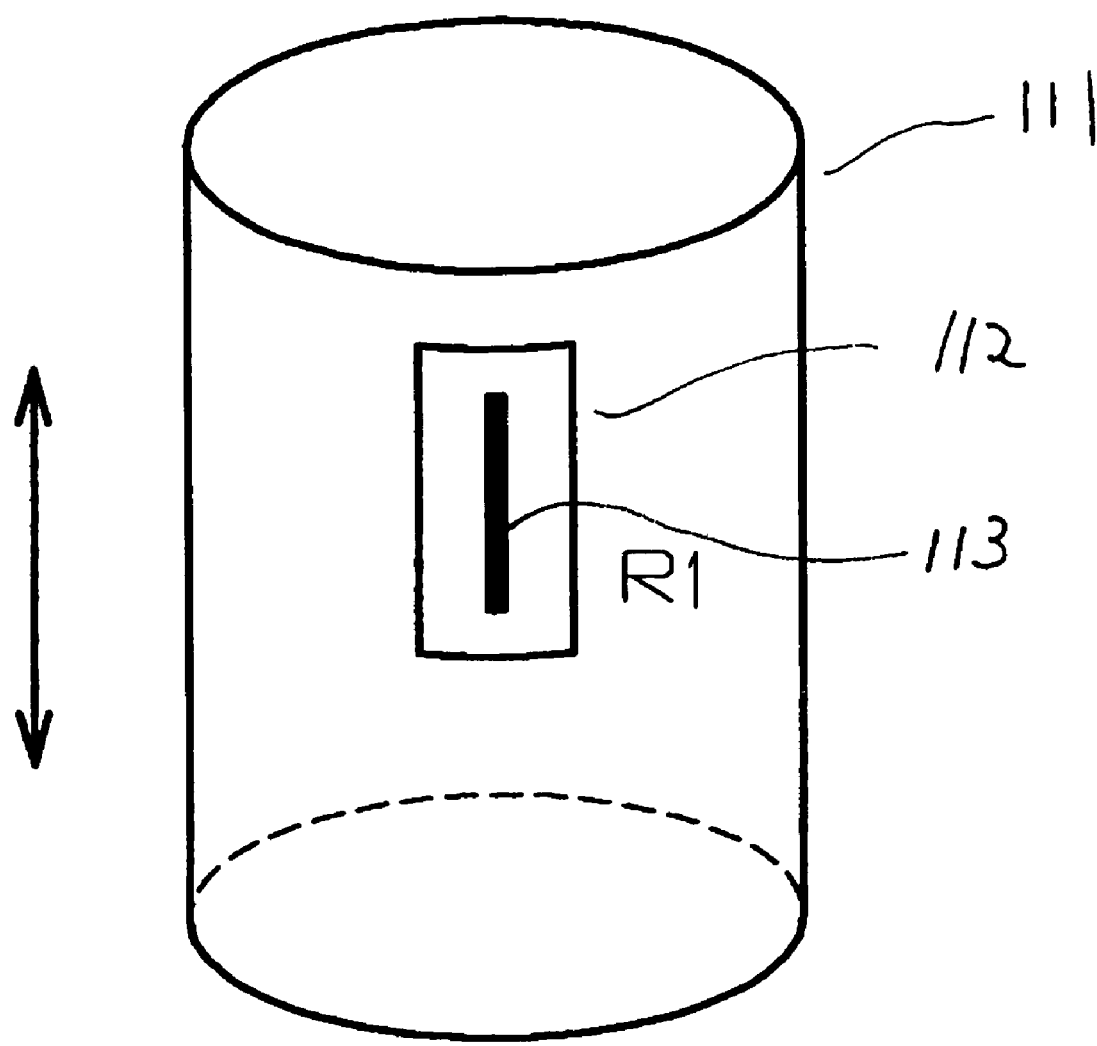
FIG. 11A is a drawing showing a method of adhering the gauge.
Figure 11B:
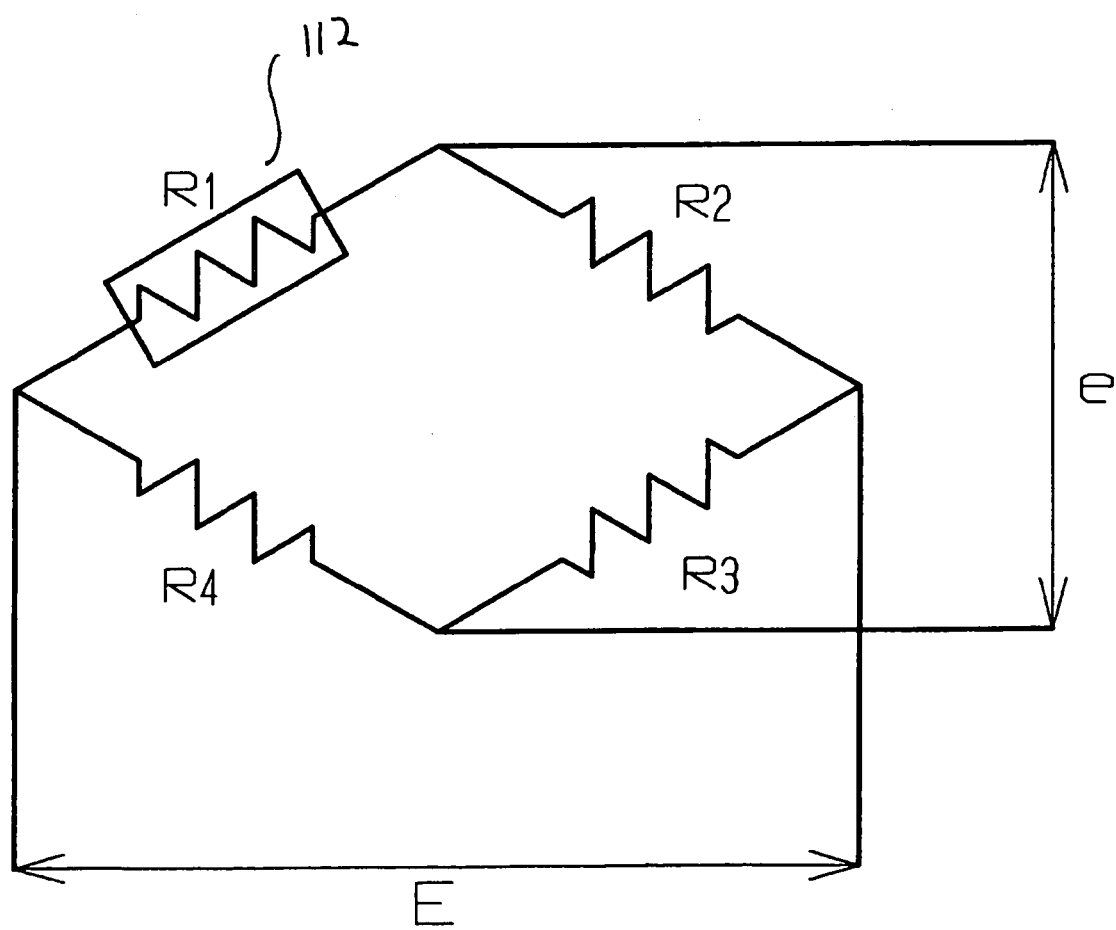
FIG. 11B is a connection circuit diagram.
Figure 12A:
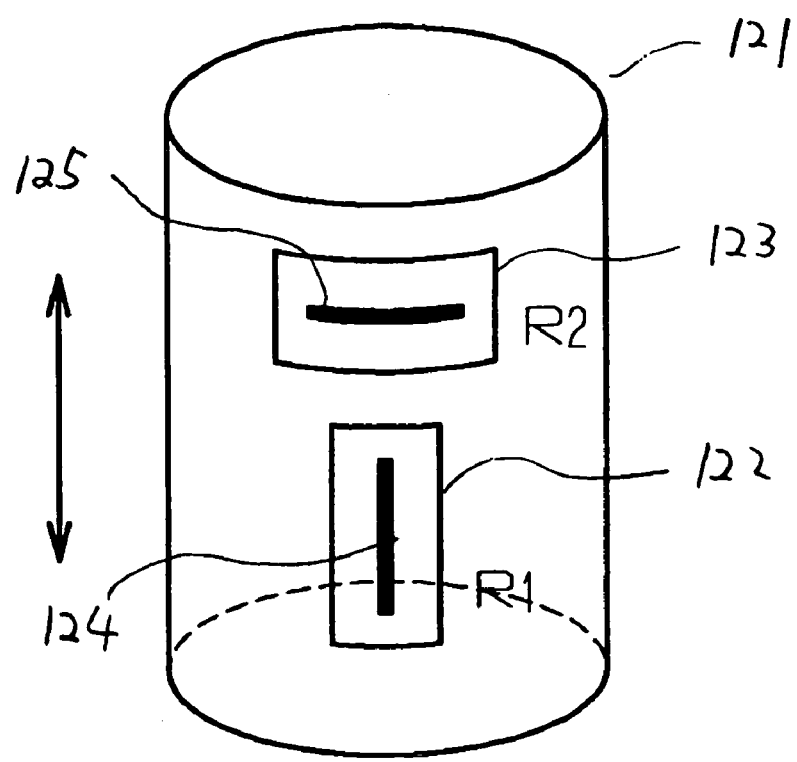
FIG. 12A is a drawing showing a method of adhering the gauge.
Figure 12B:
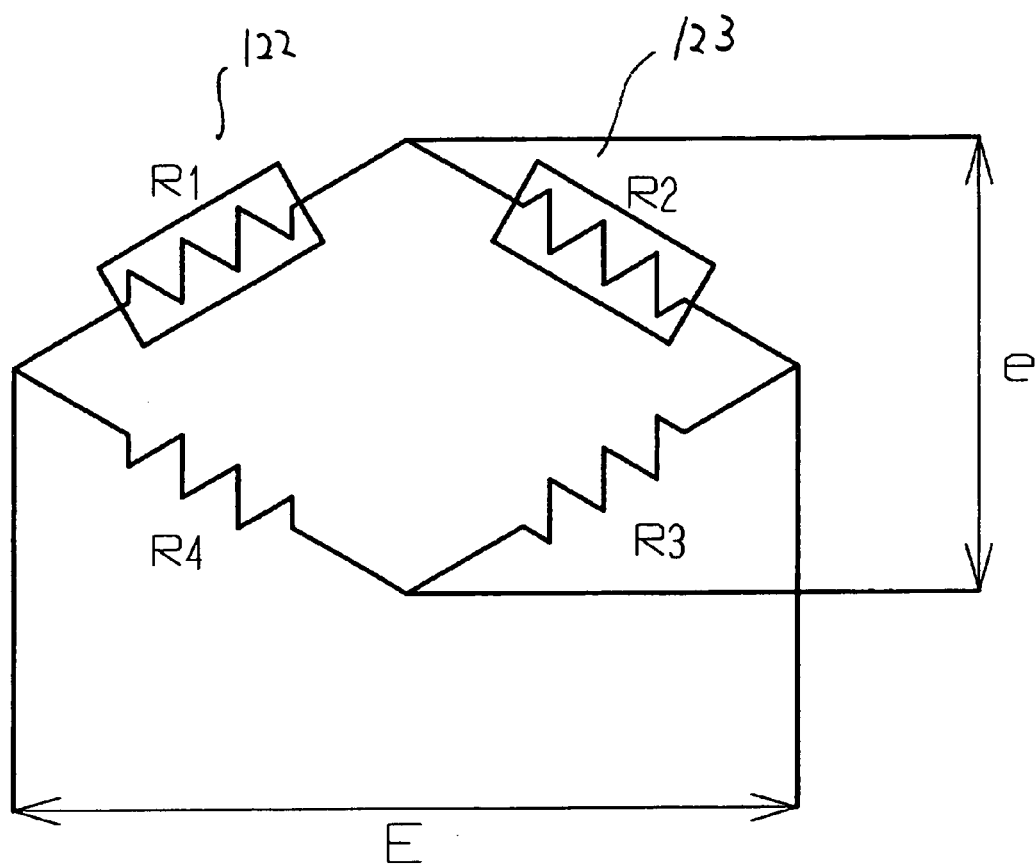
FIG. 12B is a connection circuit diagram.
Figure 13A:
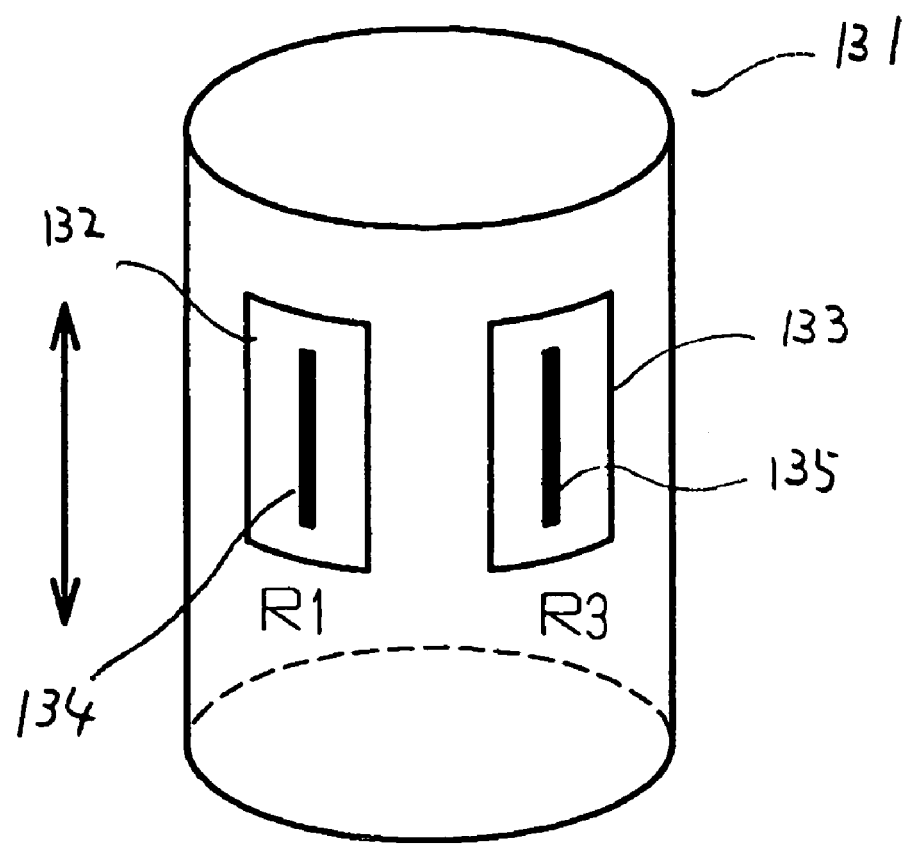
FIG. 13A is a drawing showing a method of adhering the gauge.
Figure 13B:
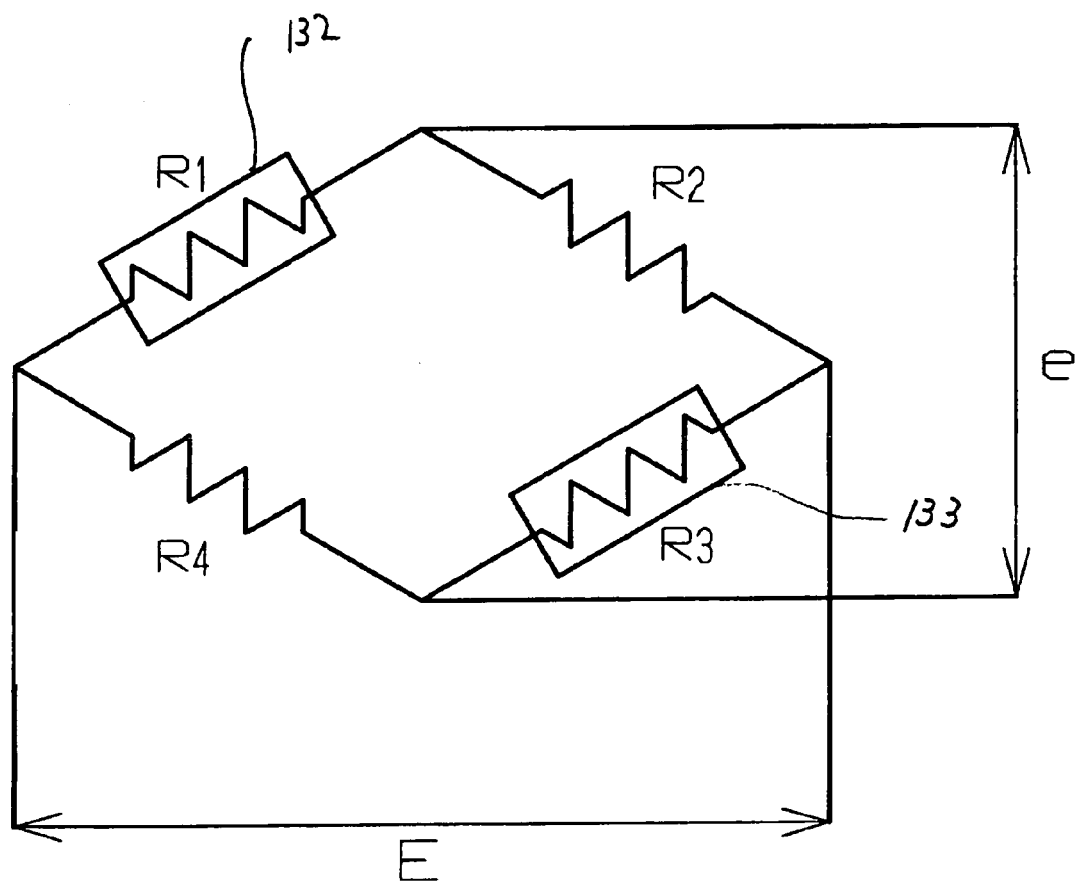
FIG. 13B is a connection circuit diagram.
Figure 14A:
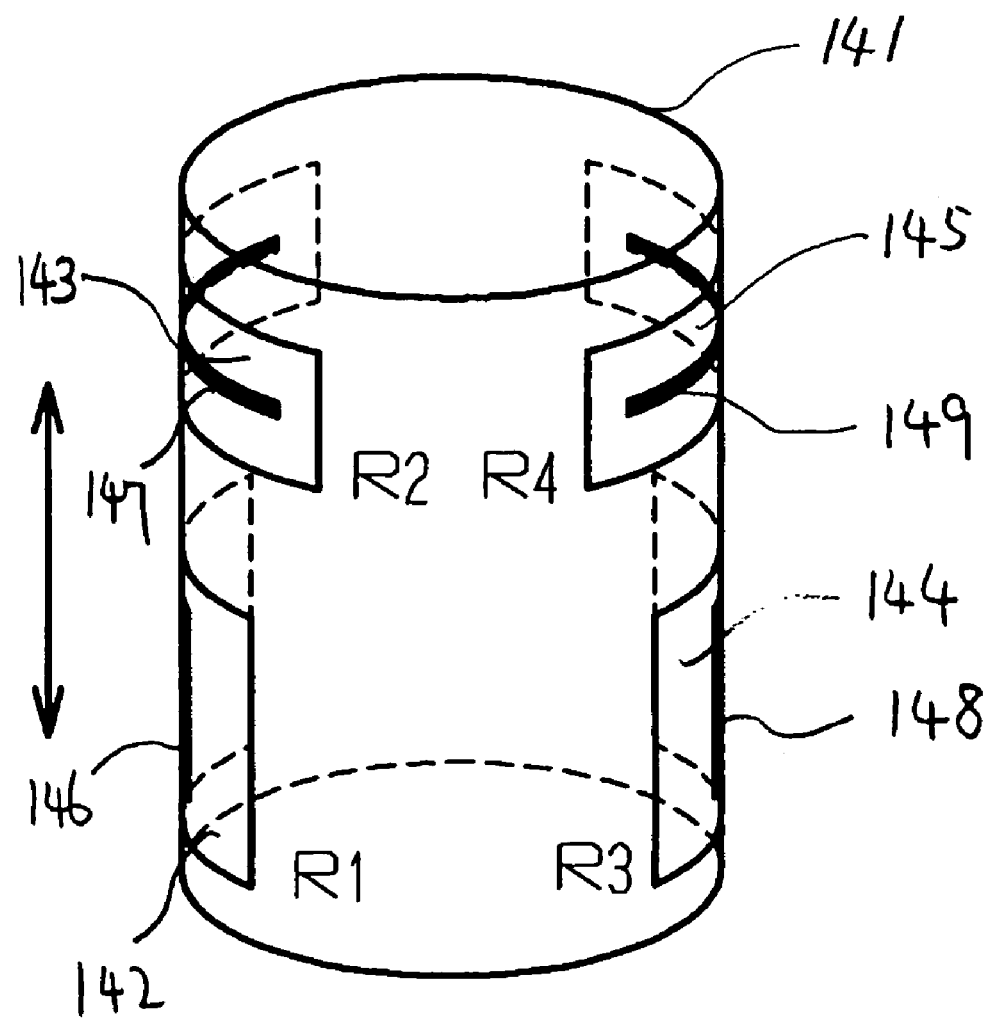
FIG. 14A is a drawing showing a method of adhering the gauge.
Figure 14B:
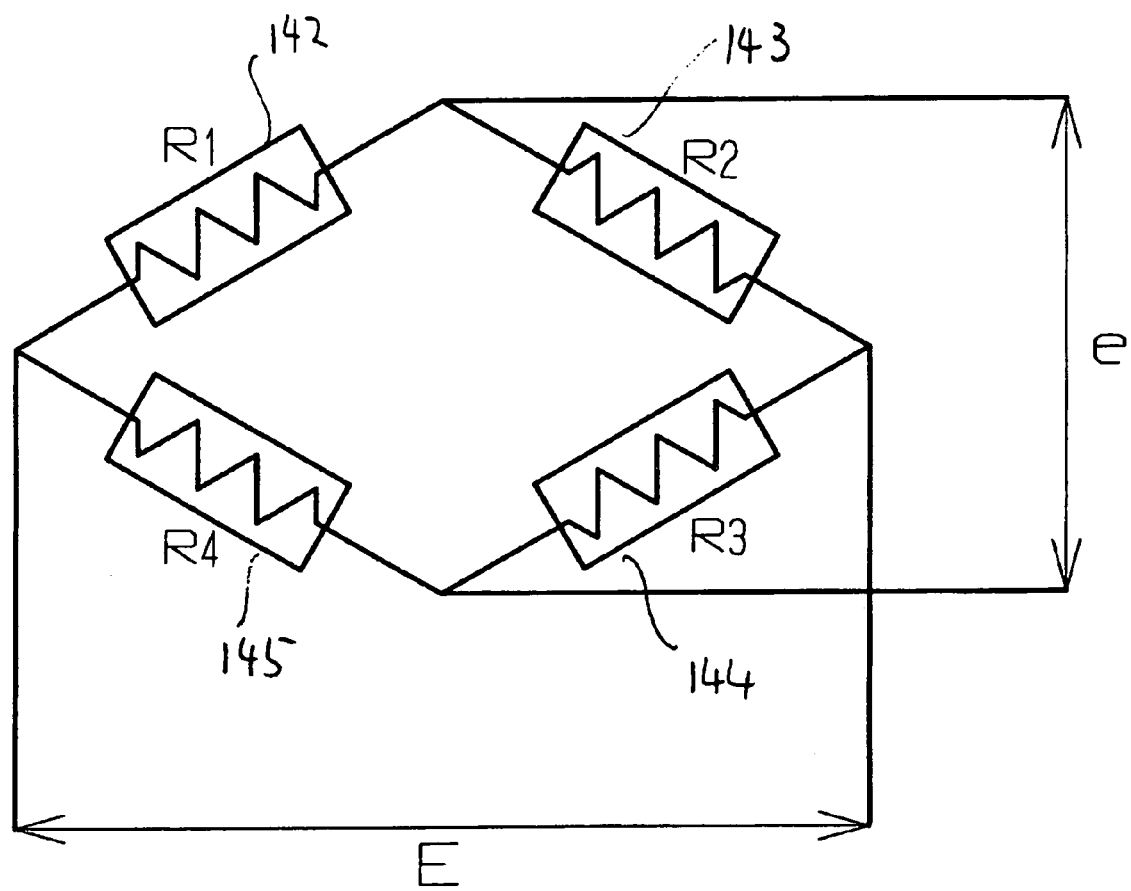
FIG. 14B is a connection circuit diagram.
Figure 15A:
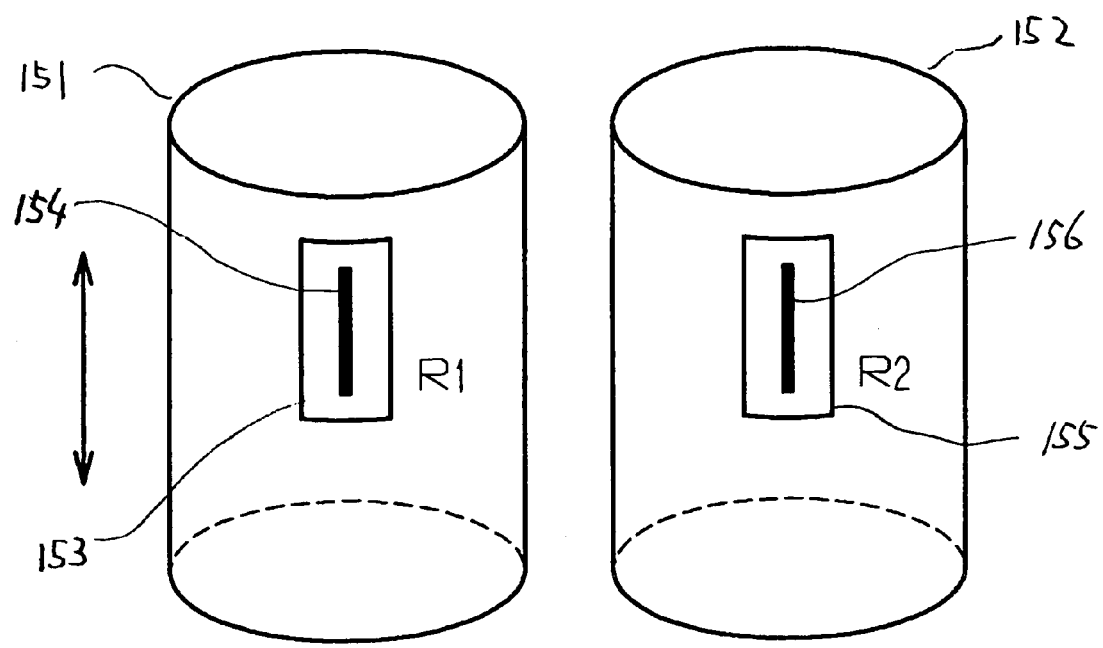
FIG. 15A is a drawing showing a method of adhering the gauge.
Figure 15B:
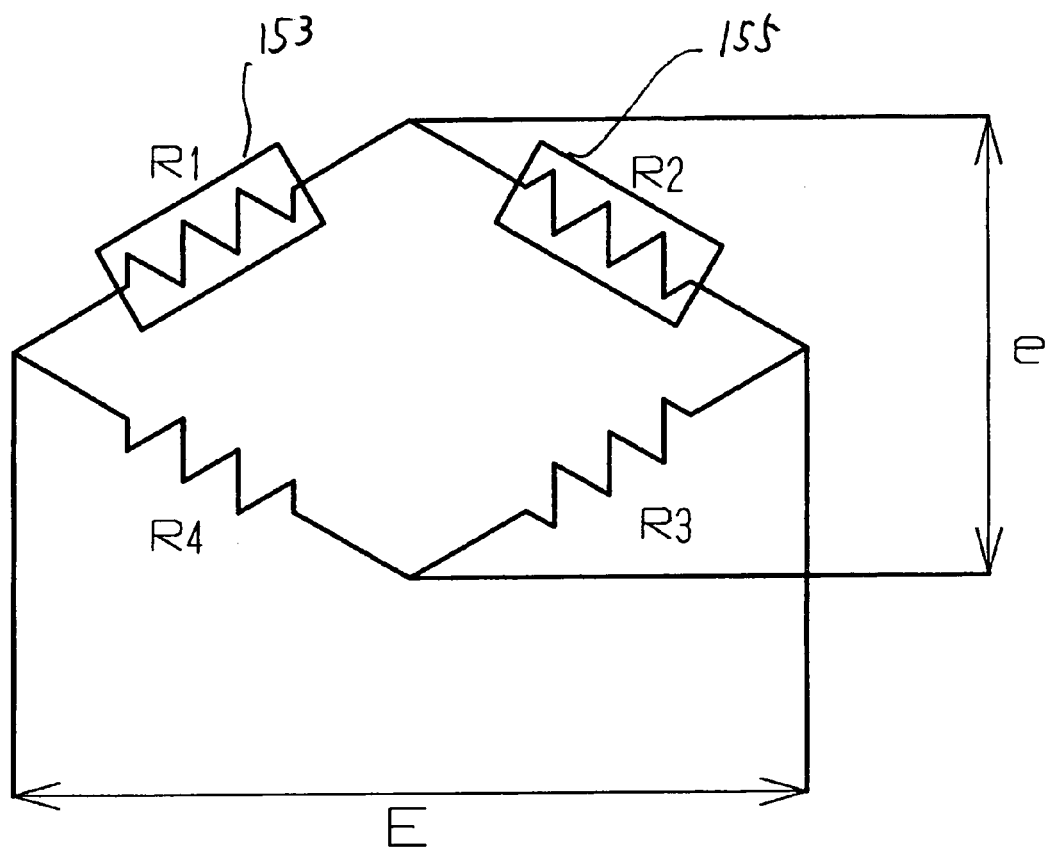
FIG. 15B is a connection circuit diagram.

When the proximal end 1a of the cylindrical piezoelectric device 1 is fixed as the fixed end, and the distal end 1b there of is remained free as a free end, as the related art shown in FIG. 8B, the distal 1b portion is displaced in an arcuate shape in the direction indicated by an arcuate arrow in FIG. 8B. When the angle of strain is minute, the distal end moves approximately within a plane orthogonal to the center axis. Therefore, displacement within a two-dimensional plane is achieved by the quadrant electrode 4. Since the quadrant electrode 4 is provided on the fixed end side, and is configured in such a manner that the output displacement is increased by an amount corresponding to the lengths of the band shaped electrodes 2, 3.

Here, the two strain gauges 6 adhered on the band-shaped Z-electrode 2 on the first level are represented by R1, R3, and the two strain gauges 6 adhered on the band-shaped dummy electrode 3 on the second level are represented by R2, R4, respectively. The four in total strain gauges R1, R2, R3, R4 adhered on the band-shaped Z-electrode 2 and dummy electrode 3 in two levels are electrically connected at both ends of the linear pattern of the semiconductor 7 resistor and are configured as a bridge circuit.

Figure 3:
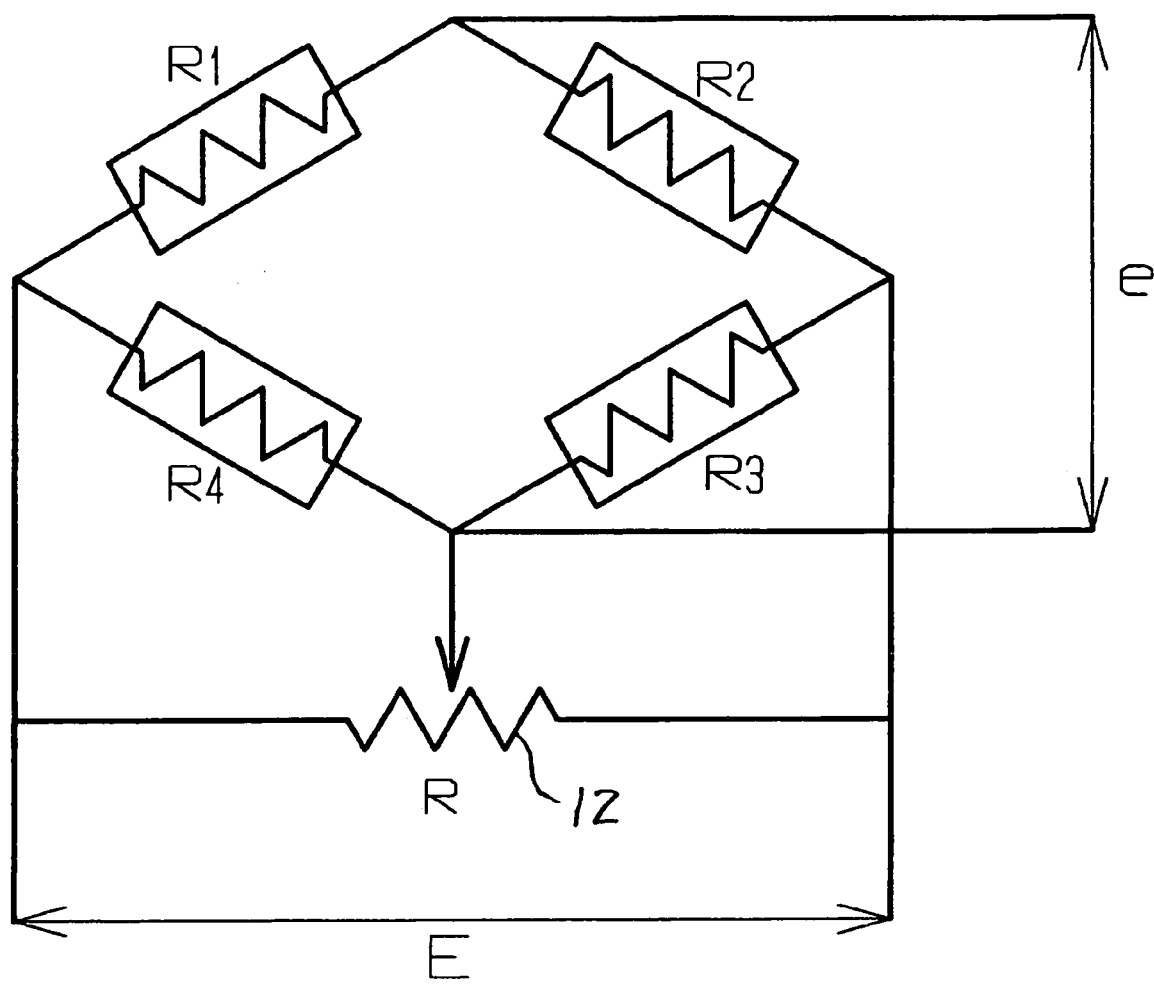
FIG. 3 is a connection circuit diagram of the strain gauges adhered on the electrodes on the respective axes of the fine-adjustment mechanism shown in FIG. 2.

FIG. 3 is a drawing showing a method of connecting the strain gauges adhered to the electrodes on the respective axes shown in FIG. 2. The reference numerals R1, R2, R3, R4 of the resistor in FIG. 3 corresponds to the numerals R1, R2, R3, R4 of the strain gauges of band-shaped Z-electrode 2 and dummy electrode 3 in FIG. 2, respectively.

As shown in FIG. 3, the bridge circuit is configured in such a manner that DC voltage of Voltage E is applied between the resistor R1 and the resistor R4 and between the resistor R2 and the resistor R3, so that the output voltage e from between the resistor R1 and the resistor R2 and between the resistor R3 and the resistor R4 can be detected by the change of the resistance value due to strains of the respective resistors R1, R2, R3, R4.

In general, since the initial value of resistance of the strain gauge varies depending on the individual difference, a variable resistance is added for adjustment to eliminate such variations in initial value of resistance. In the bridge circuit shown in FIG. 3, an example in which a variable resistance 12 of three-contact point system is used, in which the output voltage e is adjusted to be 0V by varying the value of resistance of the variable resistance 12 in a state in which no strain is generated at the respective resistors R1, R2, R3, R4.

In this state, voltage is applied to the electrode 2 on the first level to allow the strain $\varepsilon_z$ to generate in the Z direction in the first level. The change of the strain gauge due to the change of environment, such as temperature, is represented by $\varepsilon_T$. The Z-electrode 2 and the dummy electrode 3 on which the respective strain gauge is adhered are formed of the same material, and are disposed on the identical cylindrical piezoelectric device in juxtaposed manner, environment in which the respective strain gauges are exposed is the same, and hence the amount of strain due to the change of the temperature is the same.

Therefore, from the expression (1), the output voltage is:

$$e = Ks/4 \cdot (\varepsilon_1 - \varepsilon_2 + \varepsilon_3 - \varepsilon_4) \cdot E \qquad (7)$$
$$= Ks/4 \cdot \{(\varepsilon_Z + \varepsilon_T) - (\varepsilon_T) + (\varepsilon_Z + \varepsilon_T) - (\varepsilon_T)\} \cdot E$$
$$= Ks/4 \cdot 2\varepsilon_Z \cdot E$$

Consequently, strain due to the temperature is eliminated, and the output voltage amplified to double is obtained.

In general, the strain gauge having a semiconductor resistor is small in maximum allowable strain. Therefore, when the semiconductor strain gauge is adhered on the curved cylindrical surface, it is bent to a degree exceeding the maximum allowable strain, and hence measurement cannot be performed. However, according to the present embodiment, since the linear gauge is adhered in such a manner that longitudinal direction of the linear pattern of gauge is adhered in the direction parallel to the center axis, the direction of adhesion of the resistor is not a curved surface but a flat shape, whereby a problem such that the degree of deformation exceeds the maximum allowable amount of strain does not occur.

The strain gauges R1, R2, R3, R4 adhered on the respective electrodes 4a, 4b, 4c, 4d of the quadrant electrode on two by two basis are also configured into a bridge circuit as shown in FIG. 3. In other words, the strain gauges R1, R3 and R2, R4 of the X-electrodes 4a, 4c for driving in the direction of X-axis correspond to the resistors R1, R3 and R2, R4 in the bridge circuit shown in FIG. 3, respectively. The strain gauges R1, R3 and R2, R4 on the Y-electrodes 4b, 4d for driving in the direction of Y-axis corresponds to the resistors R1, R3 and R2, R4 in the bridge circuit shown in FIG. 3, respectively.

Describing the X-electrodes 4a, 4c for driving in the X-axis direction, voltage is applied to the respective electrodes, and when an extension strain+$\varepsilon_X$ in parallel with the center axis is generated on one of the electrode 4a side, a compression strain-$\varepsilon_X$ of opposite polarity and equal in absolute value is generated at the opposing electrode 4c, and consequently, the cylindrical piezoelectric device is curved about the fixed end 1a at the proximal end. Since the adhering environment of the respective strain gauge is the same, the same amount of strain $\varepsilon$ due to the temperature is generated at the respective strain gauge. The output voltage at this time is obtained from the expression (1) as follows.

$$e = Ks/4 \cdot (\varepsilon_1 - \varepsilon_2 + \varepsilon_3 - \varepsilon_4) \cdot E \qquad (8)$$
$$= Ks/4 \cdot \{(\varepsilon_X + \varepsilon_T) - (-\varepsilon_X + \varepsilon_T) + (\varepsilon_X + \varepsilon_T) - (-\varepsilon_X + \varepsilon_T)\} \cdot E$$
$$= Ks/4 \cdot 4\varepsilon_X \cdot E$$

In other words, strain due to the temperature is eliminated and strain amplified to four-fold is obtained.

Referring to the expression (7) and the expression (8), the output voltage e is proportional to the gauge factor $K_s$ and the voltage E applied to the bridge circuit. In other words, the larger the gauge factor $K_s$ and the applied voltage E are, the larger output signal is obtained. The commercially available strain gauge is most generally of 120Ω in value of resistance and gauge factor $K_s=2$, provided with a metal resistor, while the characteristics of the semiconductor strain gauge used in this embodiment are, 2 kΩ in value of resistance, and gauge factor $K_s=170$.

Therefore, since the gauge factor of the semiconductor gauge is 85 times larger than the gauge using the metal resistor, and the value of resistor is about 17 times larger, voltage to be applied to the resistor, that is, the value of E can be increased, whereby the amplification factor can be increased. Consequently, the S/N ratio of the output signal is increased, so that measurement with high degree of accuracy is enabled even when the amount of strain is minute. The amount of strain with respect to the temperature of the semiconductor resistor is larger than the metal resistor, and hence measurement accuracy is lowered. However, in this embodiment, since temperature compensation is performed by the bridge circuit, lowering of measurement accuracy is prevented even when the semiconductor resistor is used.

Subsequently, the scanning probe microscopy using the fine-adjustment mechanism formed of the cylindrical piezoelectric device 1 will be described. Here, a case where an atomic force microscope is used as an example of the scanning probe microscopy will be described.

Figure 4:
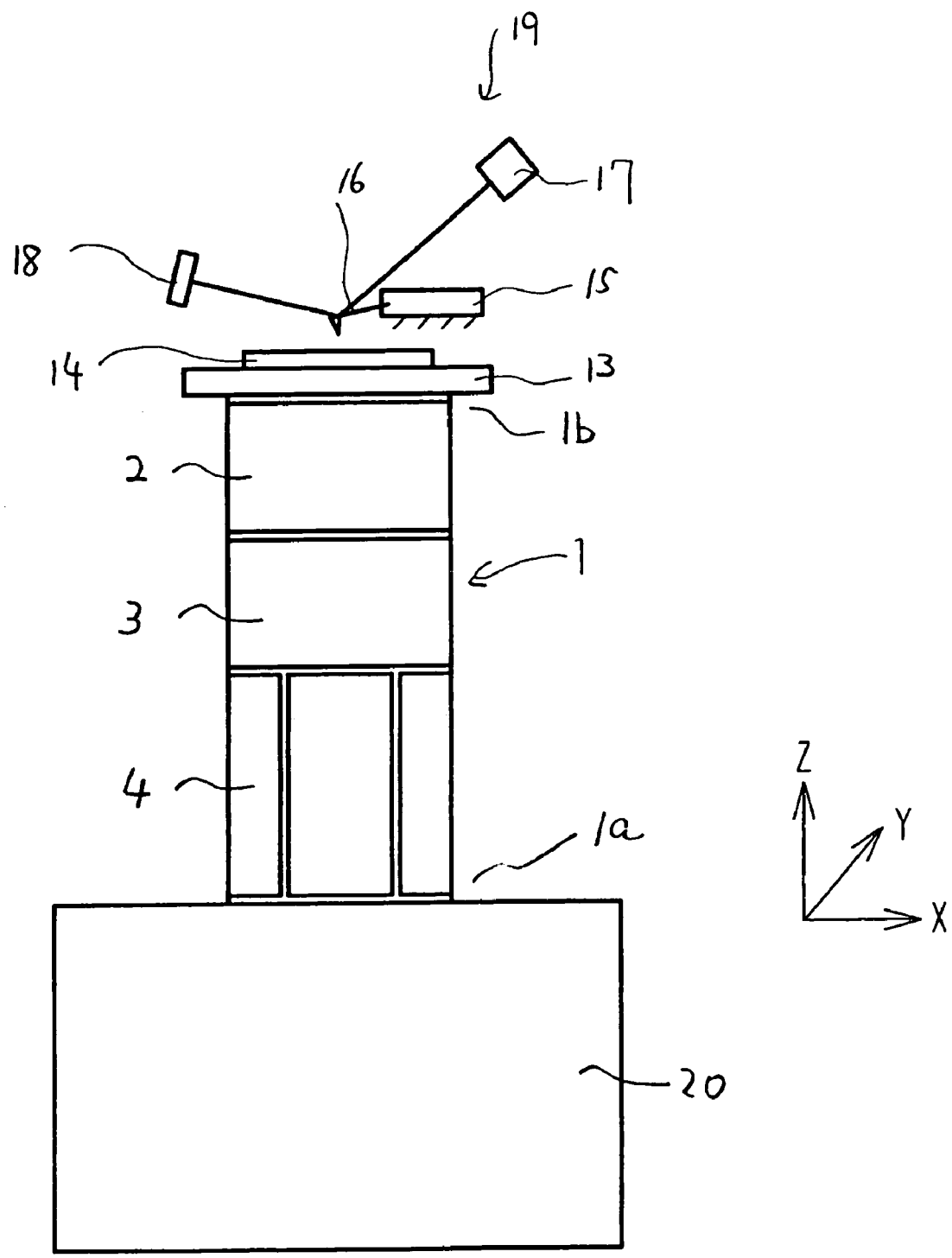
FIG. 4 is a general view of an atomic force microscopy configured with the fine-adjustment mechanism shown in FIG. 1.

FIG. 4 is a general view of an atomic force microscopy configured with the fine-adjustment mechanism formed of the cylindrical piezoelectric device 1 shown in FIG. 1.

A fine adjustment mechanism 1 is fixed at the proximal end 1a to the upper surface of a coarse adjustment mechanism 20, and is provided with a sample stage 13 at the distal portion 1b. A probe holder 15 is provided at the position opposing to a sample 14 placed on the sample stage 13, and a cantilever 16 having a minute probe at the distal end thereof is fixed. The displacement of the cantilever 16 is measured by an optical lever 19 composed of a semiconductor laser 17 and a quadrant photo detector 18. The fine-adjustment mechanism formed of the cylindrical piezoelectric device 1 is disposed on the coarse adjustment mechanism 20, and places the sample 14 in the vicinity of a probe 16.

When the sample 14 and the probe 16 are positioned close to each other to the region where the atomic force becomes effective, the force exerted between the probe and the sample depends on the distance therebetween. Therefore, the distance between the probe and the sample can be maintained at a constant value by detecting deflection of the cantilever 16 by the optical lever 19, and adjusting the distance by displacement of the fine-adjustment mechanism formed of the cylindrical piezoelectric device 1 in the direction of Z-axis by the Z-electrode 2 so that the amount of deflection which is preset is obtained. At this time, when raster scan is performed on the sample 14 in the direction of XY axis by the quadrant electrode 4 of the fine adjustment mechanism formed of the cylindrical piezoelectric device 1, the image of roughness on the sample surface can be obtained.

At this time, by monitoring the output signals of the strain gauges (not shown) adhered on the respective electrodes, the amount of displacement in the XYZ directions can be acquired. In the example shown above, DC voltage is applied on the bridge circuit. However, in this case, AC voltage is applied in order to improve S/N ratio, and the output signal is amplified by an amplifier (not shown), and then the amount of displacement is detected by a lock-in amplifier (not shown).

As regards to the XY direction, the output signal of the strain gauge is input into a control circuit (not shown) and closed loop control is performed so that the XY direction maintain its linearity.

The Z direction fine-adjustment mechanism can be composed of a closed loop. However, in the case of the atomic force microscope, the Z direction fine adjustment mechanism is composed of an open loop since only the absolute displacement is normally necessary, and is configured to display the absolute displacement which is obtained by the output signal from the strain gauge. In this manner, by configuring the Z direction fine-adjustment mechanism of an open loop, response in the Z-axis direction is improved.

Second Embodiment

Figure 5:
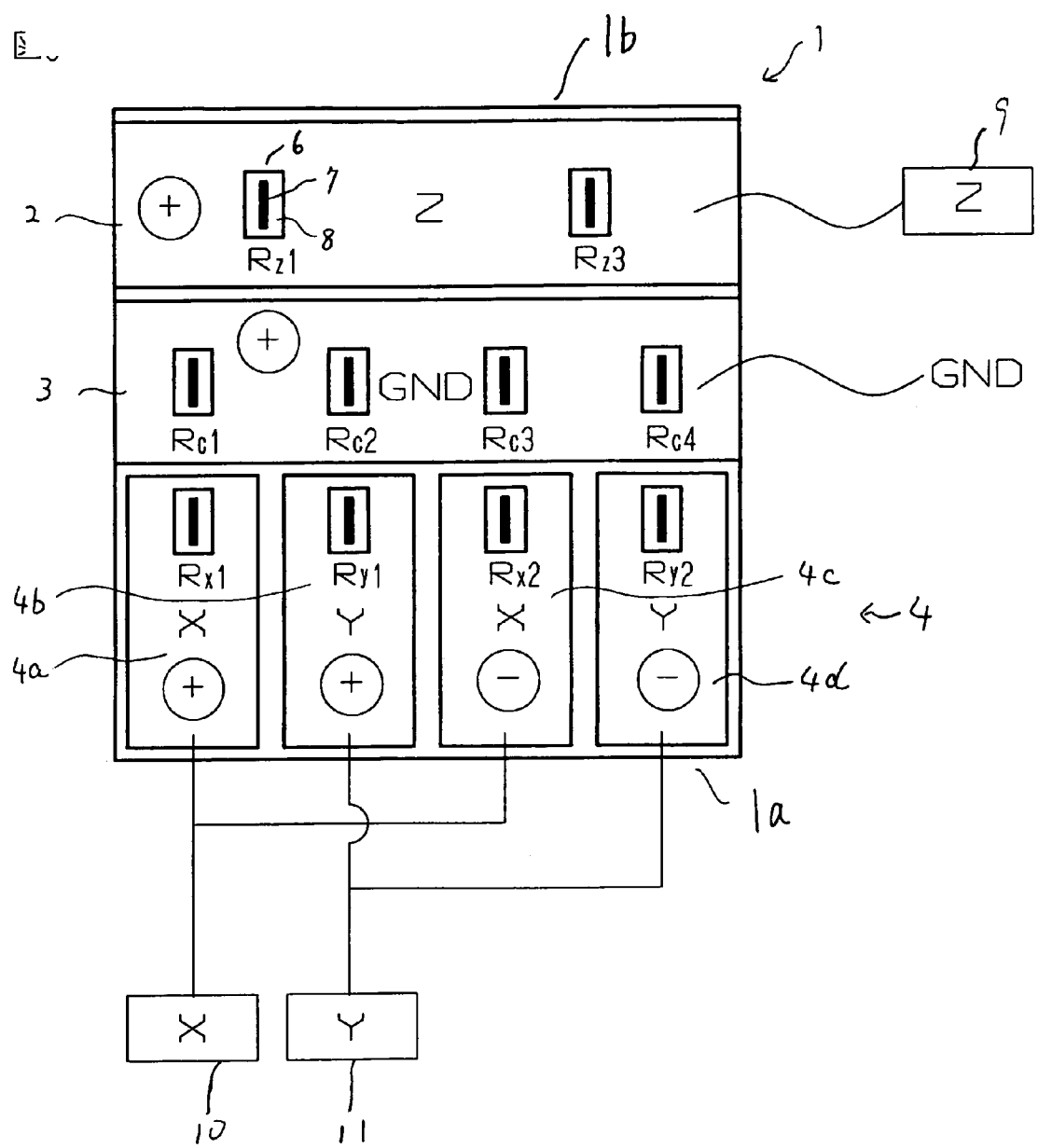
FIG. 5 is an expansion plan of the fine-adjustment mechanism for the scanning probe microscopy formed of a cylindrical piezoelectric device according to a second embodiment of the invention.

Subsequently, referring to FIG. 5, FIG. 6 and FIG. 7, a second embodiment of the fine-adjustment mechanism for the scanning probe microscopy will be described. The common components to the respective components described in the first embodiment are represented by the same reference numerals and the common contents relating to the structure or operation among the respective components will not be described in detail.

The fine-adjustment mechanism according to the second embodiment also employs the cylindrical piezoelectric device 1 having the same shape as in the first embodiment shown in FIG. 1. FIG. 5 is an expansion plan of the outer peripheral surface of the cylindrical piezoelectric device, showing adhesion of the strain gauges, polarities of poling (plus and minus signs), and wiring for high voltage to be applied to the respective electrodes In the second embodiment, two strain gauges Rz1, Rz3 are adhered on the band-shaped Z-electrode 2 for fine-adjustment in the Z direction, strain gauges Rx1, Rx2, Ry1, Ry2 are respectively adhered to the X-electrodes 4a, 4c and the Y-electrodes 4b, 4d for fine-adjustment in the XY direction, and four strain gauges Rc1, Rc2, Rc3, Rc4 are adhered to the band-shaped dummy-electrode 3. In other words, ten strain gauges are adhered in total.

Figure 6:
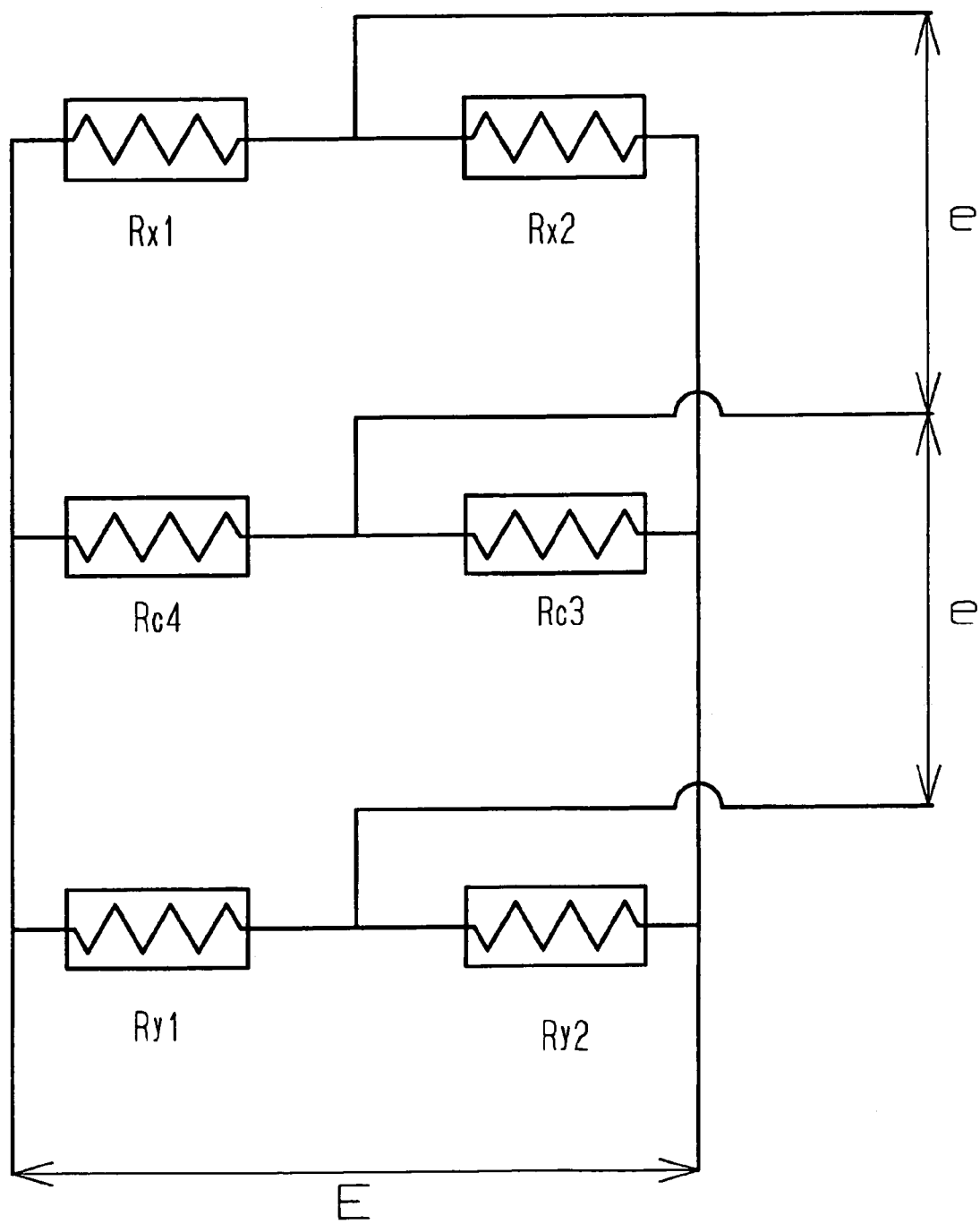
FIG. 6 is a connection circuit diagram of the strain gauges adhered on the XY-electrodes of the fine-adjustment mechanism shown in FIG. 5.

FIG. 6 is a wiring diagram of the strain gauges on the X-electrodes 4a, 4c and the Y-electrodes 4b, 4d. The resistors Rx1, Rx2, Ry1, Ry2 shown in FIG. 6 correspond to the strain gauges Rx1, Rx2, Ry1, Ry2 adhered to the X-electrodes 4a, 4c and the Y-electrodes 4b, 4d in FIG. 5, respectively, and the resistors Rc3, Rc4 shown in FIG. 6 correspond respectively to the two strain gauges Rc3, Rc4 out of four strain gauges adhered on the band shaped dummy electrode 3 in FIG. 5.

Figure 7:
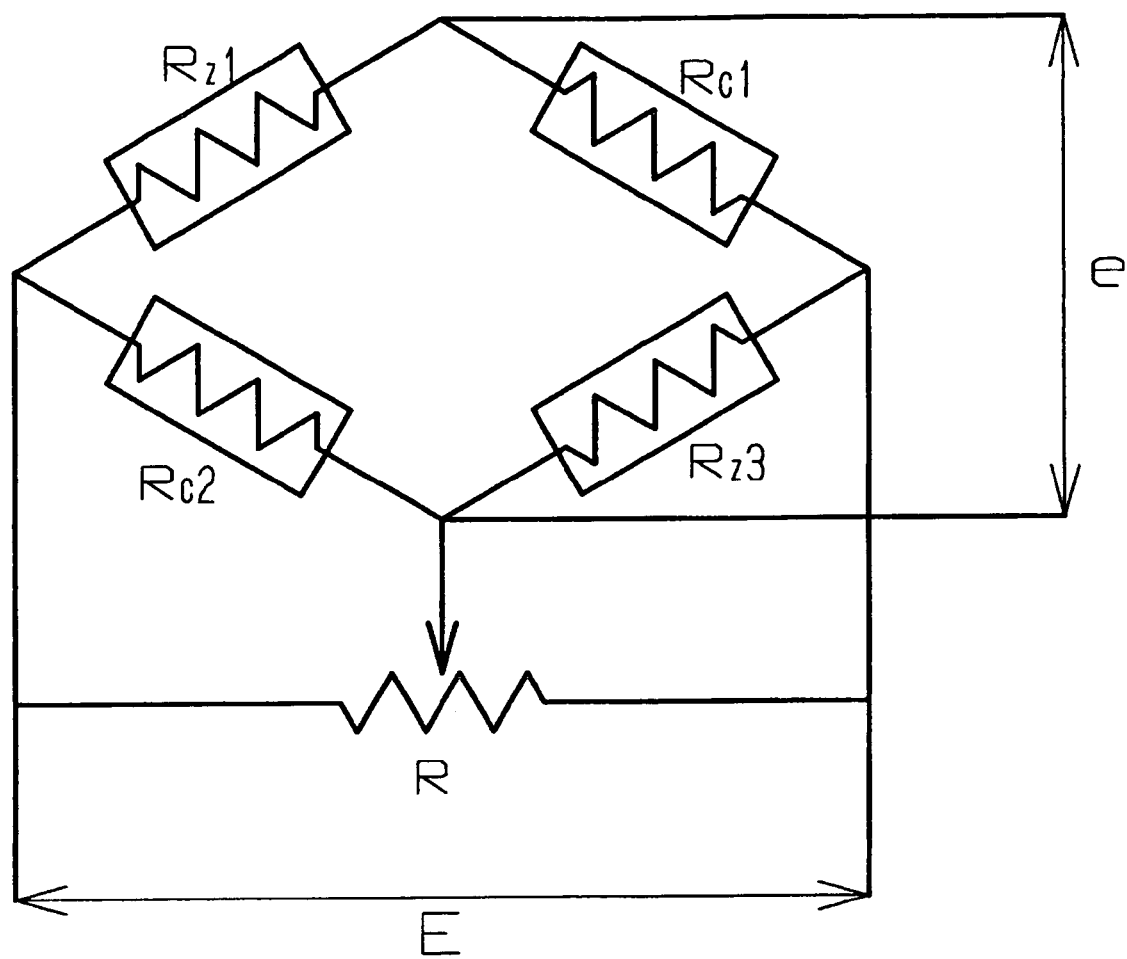
FIG. 7 is a connection circuit diagram of the strain gauges adhered on the Z-electrode on the fine-adjustment mechanism shown in FIG. 5.

FIG. 7 is a wiring diagram of the strain gauges on the band-shaped Z-electrode 2. The resistors Rz1, Rz3 shown in FIG. 7 correspond respectively to the strain gauges Rz1, Rz3 adhered on the band-shaped Z-electrodes 2 in FIG. 5. The resistors Rc1, Rc2 shown in FIG. 7 correspond respectively to the two strain gauges Rc1, Rc2 out of four strain gauges adhered on the band-shaped dummy electrode 3 in FIG. 5.

In the second embodiment, a bridge circuit of Four-Gauge Method is configured with strain gauges adhered to the dummy electrode 3 for the XY-electrode 4 in addition to the Z-electrode 2. In other words, temperature compensation by Four-Gauge method using the Active-Dummy electrodes is possible at all the XYZ electrodes.

The strain gauges for the dummy electrode of the XY electrode 4 share the identical gauges Rc3, Rc4 and are configured into a bridge circuit shown in FIG. 6 in combination with the four gauges of Rx1, Rx2, Ry1, Ry2. In other words, the gauges Rc3, Rc4 are shared between the two bridge circuits as a resistor for temperature compensation. When the Four-Gauge Method is employed, although the amplification factor is increased and temperature compensation can also be performed, wiring becomes complex. However, by sharing the strain gauge for dummy between two bridge circuits, the number of gauges or wiring can be reduced.

The strain gauges Rz1, Rz3 of the Z-electrode 2 also configure a bridge circuit as shown in FIG. 7 in combination with the strain gauges Rc1, Rc2 provided on the dummy electrode 3 which is identical to XY. In this manner, by sharing the dummy electrode to which the strain gauges are adhered, the space for installation can be utilized efficiently.

The strain gauges for the dummy electrode may be adhered separately for the respective XY-electrodes in the region of the dummy electrode.

With this arrangement, temperature compensation by Four-Gauge Method can be performed. Therefore, measurement accuracy is improved, and simultaneously, the fine-adjustment device or the apparatus is downsized, whereby rigidity of the unit is improved.

The invention is not limited to the first and second embodiments described above.

Although the Four-Gauge method has been described in the above described embodiment, it is also possible to apply the Two-Gauge Method by adhering only on R1, R3 in FIG. 3 as regards the Z-direction, and only on R1, R2 in FIG. 3 as regards the XY-direction. In this case, although the obtained output is half the Four-Gauge Method, the influence of strain due to the temperature is eliminated.

The type of the resistor is not limited to semi-conductor. The metal strain gauge or the strain gauge using the piezoelectric member can also be used. In the case of the metallic strain gauge, which is the most generally used, the gauge factor is 2, which is smaller than the semiconductor strain gauge in the embodiments by on the order of 2 digits, and the value of resistance is 120Ω which is smaller on the order of one digit, whereby voltage which can be applied to the bridge circuit is also reduced. Consequently, the output voltage is significantly lowered. However, it is characterized in that the cost is low and the temperature characteristics are more preferable than the semiconductor gauge.

In addition, although the invention is applied to the Z-electrode formed of a cylindrical piezoelectric device in the embodiments, piezoelectric devices or multilayer piezoelectric devices of other shapes are all included in the invention.

Although the sample is moved by the fine-adjustment mechanism in the embodiments, it is also possible to drive the probe side.

The scope of application of the fine-adjustment mechanism of the present invention is not limited to the atomic force microscope, but may be applied to all the scanning probe microscopy such as a frictional force microscope, an atomic force microscope using a cantilever vibration, a magnetic force microscope, a scanning near field microscope, and so on. Recently, the scanning probe microscopy is also applied to machining of samples, manipulation of the samples as well. In these applications, accuracy in positioning of the fine-adjustment device is required, and hence the fine-adjustment mechanism for a scanning probe microscopy of the present invention is quite effective.

What is claimed is:

1. A fine-adjustment mechanism for a scanning probe microscopy for fine-adjusting the relative position between a subject to be measured (sample) and a probe in order to measure roughness or physical properties of the subject to be measured by scanning the surface of the subject to be measured by the probe comprising:
   a piezoelectric device constituting the fine-adjustment mechanism;
   at least two electrodes for applying voltage to the piezoelectric device, at least one of the electrodes being used as a dummy electrode on which no voltage is applied and the other electrode being used as an active electrode that generates a strain on the piezoelectric device when applied with voltage;
   one or two resistors for detecting the strain at one or two positions on the active electrode; and
   one or more resistors provided on the dummy electrode,
   wherein the respective resistors on the active electrode and the dummy electrode are connected so that temperature compensation is performed by the resistor on the dummy electrode when strain detection is performed by the resistor on the active electrode to form a bridge circuit.

2. A fine-adjustment mechanism for a scanning probe microscopy according to claim 1 comprising two or more active electrodes, wherein the respective resistors of the active electrodes share the identical resistor for temperature compensation on the dummy electrode to configure a bridge circuit.

3. A fine-adjustment mechanism for a scanning probe microscopy according to claim 1, wherein the fine-adjustment mechanism is formed of a hollow cylindrical piezoelectric device comprising a common electrode provided within the cylinder and two or more electrodes on the outside thereof, wherein at least one of the two or more electrodes on the outside is used as a dummy electrode.

4. A fine-adjustment mechanism for a scanning probe microscopy according to claim 2, wherein the fine-adjustment mechanism is formed of a hollow cylindrical piezoelectric device comprising a common electrode provided within the cylinder and two or more electrodes on the outside thereof, wherein at least one of the two or more electrodes on the outside is used as a dummy electrode.

5. A fine-adjustment mechanism for a scanning probe microscopy according to claim 4, wherein the resistor is formed of a linear pattern of semiconductor and is arranged so that the longitudinal directions of the linear pattern of resistor provided on each of the active electrode and the dummy electrode extend in parallel with the direction of the center axis of the cylindrical piezoelectric device.

* * * * *